(12) United States Patent
Wang et al.

(10) Patent No.: US 11,767,035 B2
(45) Date of Patent: Sep. 26, 2023

(54) AUTONOMOUS PARKING WITH HYBRID EXPLORATION OF PARKING SPACE

(71) Applicant: Mitsubishi Electric Research Laboratories, Inc., Cambridge, MA (US)

(72) Inventors: Yebin Wang, Acton, MA (US); Siyu Dai, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/012,384

(22) Filed: Sep. 4, 2020

(65) Prior Publication Data

US 2022/0073101 A1 Mar. 10, 2022

(51) Int. Cl.
| | |
|---|---|
| *B60W 60/00* | (2020.01) |
| *B60W 30/06* | (2006.01) |
| *B60W 30/09* | (2012.01) |
| *B60W 30/095* | (2012.01) |
| *G01C 21/34* | (2006.01) |

(52) U.S. Cl.
CPC ........ *B60W 60/0015* (2020.02); *B60W 30/06* (2013.01); *B60W 30/09* (2013.01); *B60W 30/0956* (2013.01); *G01C 21/343* (2013.01); *G01C 21/3453* (2013.01)

(58) Field of Classification Search
CPC ........ B60W 60/0015; B60W 60/0016; B60W 30/06; B60W 30/095; B60W 60/001; B60W 60/0011; B60W 60/00184; G01C 21/343; G01C 21/3446; G05B 2219/40476; G05B 2219/40477; G05B 2219/40488
See application file for complete search history.

(56) References Cited

U.S. PATENT DOCUMENTS 11,142,188 B2 * 10/2021 Funke .................... G05D 1/027
2021/0020045 A1 * 1/2021 Huang ............... G01C 21/3804

OTHER PUBLICATIONS

Chao Chen, Motion Planning for Nonholonomic Vehicles with Space Exploration Guided Heuristic Search, Aug. 2016 (Year: 2016).*
Long Han, Unified Path Planner for Parking an Autonomous Vehicle based on RRT, May 2011, IEEE (Year: 2011).*

* cited by examiner

*Primary Examiner* — Christian Chace
*Assistant Examiner* — Shayne M. Gilbertson
(74) *Attorney, Agent, or Firm* — Gennadiy Vinokur; Hironori Tsukamoto

(57) ABSTRACT

A control system for parking a vehicle uses a directed graph representing a traffic network within parking space to determine a coarse path subsequently refined to control the vehicle according to refined path. The directed graph includes waypoints connected by edges, a waypoint defines a position and an orientation, while edge defines a collision free path for the vehicle. The coarse path is selected as a shortest route of waypoints connecting an initial waypoint on the directed graph closest to the initial state of the vehicle with a target waypoint on the directed graph closest to the target state of the vehicle. The refined path is a path on a tree constructed to reduce a deviation of a cost of a motion defined by a refined path connecting the initial node with the target node of the tree from a cost of the coarse path defining the route of waypoints.

20 Claims, 24 Drawing Sheets

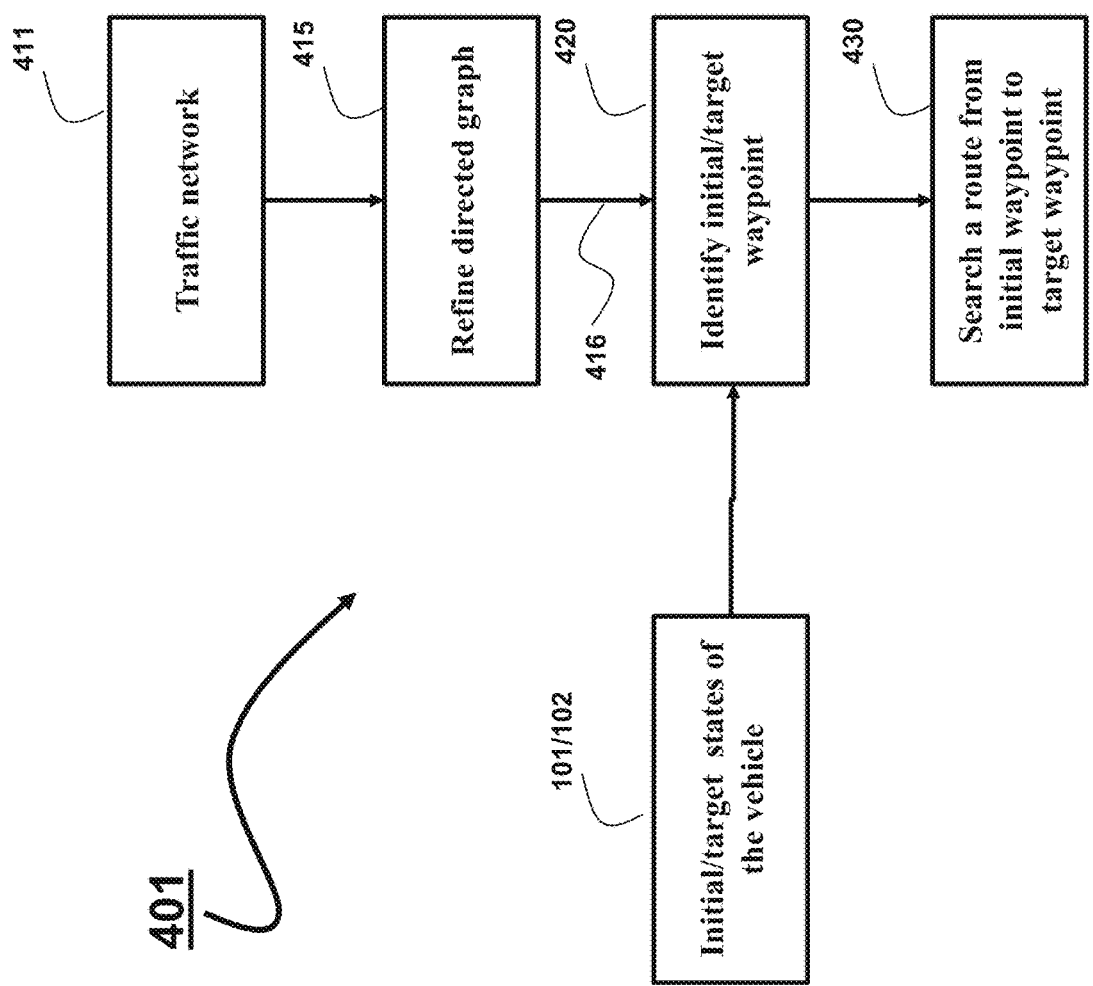

the entire page.

AUTONOMOUS PARKING WITH HYBRID EXPLORATION OF PARKING SPACE

TECHNICAL FIELD

This invention relates generally to path planning for vehicles, and more particularly to path planning methods for controlling a movement of a vehicle from an initial state into a target space in a deterministic manner.

BACKGROUND

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

Path planning arises in a variety of applications such as autonomous vehicles, robotics, manufacturing, and computer vision applications. Many planning algorithms have been proposed, including, to name a few, graph-based A* and D* methods, continuous approaches involving navigation function and potential fields; more recently, sampling-based method such as probabilistic roadmaps (PRM), expansive-space trees, rapidly-exploring random trees (RRT), optimal variants RRT* and probabilistic roadmap (PRM*), anytime RRT, and A-search guided tree (AGT).

One of the tasks for controlling the autonomous or semi-autonomous vehicles executing in autonomous-driving mode automatically parks a vehicle into a parked position and orientation referred herein as a target state. The parking task can be formulated as the following. Given vehicle dynamics, a map of the parking space, an initial state representing the vehicle's start position and orientation, and a target state representing the vehicle's target parked position and orientation, determine a desired path or motion of the vehicle from the initial state to the target state and then control the actuators of the vehicle, e.g., vehicle's gas pedal and steering wheel, to ensure that the vehicle follows the desired path or motion. However, due to nonholonomic constraints on the motion of the vehicle and a typically narrow free space in the parking space, such as a parking garage or a parking lot, path planning for automatically parking a vehicle is challenging.

A broad spectrum of graph-based approaches searches a pre-defined graph, which approximates the configuration space of a robot. The graph is somewhat static in the sense that each node and edge represent the same configuration and connecting path, respectively. Both nodes and edges of the graph are marked as collision-free or occupied during the exploration of search algorithms. Well-established algorithms such as A* and D* achieve resolution-completeness, with optimality guarantee under certain circumstances. Since the complexity of the pre-defined graph grows exponentially along with the dimension of the configuration space, these approaches become practically infeasible for high dimensional systems.

Sampling-based methods may overcome the dimensionality problem, and gain prevalence on high dimensional systems. According to sampling-based methods, instead of using a pre-defined graph, a graph is constructed on-the-fly, where its nodes are randomly drawn from the configuration space. The effectiveness of these methods pivots on efficiency of the graph construction (or equivalently space exploration).

However, the sampling-based methods, such as original RRT methods could be computationally expensive, due to uniform sampling strategy. To that end, a number of works exploits biased sampling schemes to improve computation efficiency. For instance, U.S. application Ser. No. 15/402,353 biases the sampling by a set of waypoints, where represent intermediate but milestone configurations. However, even biased sampling can be computationally impractical for some applications. Additionally, the computation time that sampling-based methods take to find a path is stochastic, which is undesirable in practice.

A recent work U.S. Ser. No. 16/140,591 teaches an A-search guided tree (AGT) method and its variants bi-directional AGT to solve path planning for automated parking. Its tree construction is guided by a heuristic node cost, as the celebrated A-search algorithm, whereas the heuristic node cost is exploited to bias the tree growth by selecting the node to expand (node selection step). In many cases, BIAGT outperforms, computational-wisely, conventional A-based algorithms by biasing the tree growth during node expansion, thanks to biased tree expansion in addition to biasing the tree growth through node selection. Despite BIAGT's effectiveness of solving short-range autonomous vehicle parking problems with complete map information, its performance inevitably suffers from long planning time and large number of nodes when the planning problem is long-range and when updated obstacle information received from sensors invalidates the originally planned trajectory. There is a need to further reduce the resultant tree complexity for a given long-range path planning task to adapt the automatic parking systems for limited memory and computing power of practical computing platforms.

Additionally, autonomous parking system often confronts with an environment, the map of which is not completely known in the beginning of planning. This implies that the initial path generated by a path planner might become infeasible (collide with obstacles which are unknown in the beginning). This calls for real-time adjustment of the initial path/motion. Real-time trajectory repairing has been approached from various different aspects, including online heuristic update, pruning and reconnecting sampling-based search structures, and spline-based kinodynamic search. Heuristic update methods are designed for graph-based structures and are not directly applicable to tree-based search structure, and the tree pruning and reconnecting methods are less desirable in the memory-constrained scenarios.

SUMMARY

Some embodiments are based on the recognition that various planning algorithms can be used for autonomous parking including, to name a few, graph-based A* and D* methods, continuous approaches involving navigation function and potential fields, sampling-based method such as probabilistic roadmaps (PRM), expansive-space trees, rapidly-exploring random trees (RRT), optimal variants RRT* and probabilistic roadmap (PRM*), anytime RRT, and A-search guided tree (AGT). All these planning algorithms can be used to explore the parking space using different principles adopted by different planning algorithms. For example, RRT method uses sampling to explore the parking space, while AGT expands trees with edges formed by predefined expansion primitives.

Different planning algorithms can be advantageous in one parking scenario and suboptimal in another one. However, all these planning algorithms suffer from a dimensionality problem. Specifically, the planning algorithms are typically poorly scaled to search big parking space. Indeed, for relatively small parking space of private garages, different kinds of planning algorithms can be efficiently used. However, if the parking problem is extended to a multi-floor garage or to a parking lot of a supermarket, the exploration problem becomes too big for most motion planners to satisfy memory requirement of various control systems, such as embedded advanced driver-assistance systems (ADAS). Such a problem is referred herein as a long-horizon motion panning problem.

Some embodiments are based on the realization that the long-horizon motion planning problem can be addressed by replacing a single principle of a planning algorithm with hybrid principles exploring the search space first in a coarse manner and then in a more refined manner. Some embodiments are based on the realization that the principles of coarse exploration can be different from the principles of refined explorations, because they have different objectives. Indeed, the "long-horizon motion panning problem" can be partitioned into two problems including (1) long-horizon and (2) motion planning Hence, the objective of coarse explorations is to search the space over a long horizon even if the results of exploration are not suitable for motion without additional adaptation. In contrast, the refined exploration should focus on the motion planning part without a need to worry about the long horizon aspect of the planning.

Some embodiments are based on the realization that the coarse exploration can be efficiently determined in a more deterministic manner over a predefined data structure representing a layout and/or traffic network within a parking space in a search efficient manner. Example of such a structure is a directed graph that includes waypoints connected by edges. In such a data structure, each waypoint defines a position and an orientation for the vehicle to move along the directed graph, and each edge defines collision free path for the vehicle from one waypoint to a next waypoint in the directed graph. Such a directed graph can be kinematically feasible or infeasible. An infeasible directed graph can be more easily defined using just the geometry of a vehicle, but still be an efficient tool in coarse exploration of a search space over a long-horizon, because the directed graph can be searched over a significant depth in a computationally efficient manner.

For example, in some embodiments, to park a vehicle or to move a vehicle from an initial state to a target state, the coarse path is a shortest path on the directed graph connecting an initial waypoint on the directed graph closest to the initial state of the vehicle with a target waypoint on the directed graph closest to the target state of the vehicle. Additionally, or alternatively, the coarse path can be selected subject to constraints such as heading constraint introduced to down-select initial/target waypoint candidates. Notably, the search space of coarse exploration is limited to the space of the directed graph and thus computationally efficient. However, this efficiency has its price. For example, the position and orientation of an initial waypoint can be different from the position and orientation of an initial state of the vehicle. Similarly, the position and orientation of a target waypoint can be different from the position and orientation of a target state of the vehicle. Hence, the coarse path usually does not connect the initial state with the target state of the vehicle. In addition, depending on the construction of the directed graph, the coarse path may not be kinematically feasible and cannot be used for motion planning without further adaptations. However, the construction of the coarse path through predefined search space of the directed graph is very efficient even over a long-horizon, e.g., over 50, 100 or even 1000 meters.

In contrast to the coarse path, the objective of the refined path is to focus on feasible motion planning while disregarding the extent of the long-horizon part of the motion planning problem. Some embodiments are based on realization that such an objective can be achieved if the refined plan is built as a motion plan for feasible collision free motion with a cost having the reduced, e.g., the smallest, deviation from the cost of the coarse path. Under this constraint, the refined path will tend to track the coarse path taking an advantage from the long-horizon exploration, with three notable exceptions. The first exception is the need for connecting the initial state of the vehicle with coarse path in a cost-efficient manner, the second exception is the need for connecting the coarse path with the target state in a cost-efficient manner, and the third exception is the need for providing cost effective modification for motion infeasible sections of the coarse path. Because over the long-horizon, the coarse path is mostly feasible, the refined path focuses on these relatively small exceptions. In effect, the hybrid space exploration reduces the exploration of the new areas for the refined motion planning to neighborhoods of initial and target states of the vehicle as well as neighborhoods of some turns and/or obstacle avoidance. This search space is usually much smaller than the original search space and can be efficiently performed even by embedded systems with limited computational and memory capabilities.

Accordingly, one embodiment discloses a control system for parking a vehicle within a parking space, comprising: at least one processor; and a memory having instructions stored thereon that, when executed by the at least one processor, cause the control system to: receive an initial state of the vehicle in the parking space defining an initial position and an initial orientation of the vehicle, a target state of the vehicle in the parking space defining a target position and a target orientation of the vehicle, and a directed graph representing a traffic network within the parking space, wherein the directed graph includes waypoints connected by edges, each waypoint defines a position and an orientation for the vehicle to move along the directed graph, each edge defines a collision free path for the vehicle from one waypoint to a next waypoint in the directed graph; select a coarse path defined by a shortest route of waypoints connecting an initial waypoint on the directed graph closest to the initial state of the vehicle with a target waypoint on the directed graph closest to the target state of the vehicle; construct a tree having multiple nodes defining different states of the vehicle including an initial node defining the initial state of the vehicle and a target node defining the target state of the vehicle, wherein each pair of nodes in the tree is connected with an edge defined by kinematically feasible motion moving the vehicle between the states of the connected nodes without a collision, wherein the tree is constructed to reduce a deviation of a cost of a motion defined by a refined path connecting the initial node with the target node of the tree from a cost of the coarse path defining the route of waypoints; and control the vehicle based on the refined path.

Some embodiments are based on recognition that while hybrid search exploration can be used for any motion planning problem, it gains at least some of it advantages by searching over relatively big parking space. Such parking space can have a complicated layout with intersections and turns. Such a layout is reflected in the directed graph by duplication of positions of some waypoints. Specifically, an intersection of the parking space can be represented by multiple waypoints with the same position but different orientation of a vehicle.

Some embodiments are based on understanding that the coarse path can be the shortest past connecting the initial and the target waypoints. For example, multiple waypoints can be considered as the closest from Euclidean point of view to the initial and/or target state of the vehicle. Making the coarse path the shortest can clarify this ambiguity and also reduce memory requirements of path planning Additionally, or alternatively, the initial waypoint and the target waypoint may be selected to provide the shortest coarse path subject to a heading constraint, such that the difference between the orientation of the vehicle and the orientation of the initial waypoint or the target waypoint is below a certain threshold.

Some embodiments are based on understanding that density of waypoints in the directed graph can affect minimization of the cost deviation between the refined and coarse paths. For example, with sufficient density defining distance between neighboring waypoints, the more cost-effective connection from the initial state of a vehicle to the coarse path may not be to the initial waypoint of the coarse path but to a subsequent waypoint. To that end, some embodiments, after capturing milestone waypoints of the parking space defining entrances, exits, intersections and turns within the parking space, increase the resolution of the directed graph by adding more intermediate waypoints connecting the milestone waypoints. In some implementations, the distance between neighboring waypoints in the directed graph is less than a threshold. The threshold can be defined based on geometry of an average vehicle, geometry of parking spots of the parking space, layout of the parking space, and combination thereof.

Different embodiments use different measurements of the cost of the coarse path and/or refined path. For example, some embodiments use length of a path as a measurement of a cost of the path. These embodiments are easier to implement and are align with users' intuition about the cost of the path. However, alternative measures of the cost of the path can be used such as fuel consumption and path smoothness. It should be noted that the cost of the refined path is almost always greater than the cost of the coarse path due to vehicle dynamics constraints and/or the need for the refined path to close the gaps between the initial and target states of the vehicle and the coarse path. However, it is not the objective of some embodiments to find a refined path with the same cost as the cost of the course one. For example, one of the objectives of some embodiments is to find a refined path with minimum deviation of the cost from the cost of the coarse path with respect to costs of different possibilities of the refined paths.

Some embodiments are based on recognition that different types of motion planning algorithms can be adapted to construct a tree defining the refined path. Such an adaptation can be based on optimization principles as well as based principles of construction. For example, some embodiments adapt an A-search guided tree (AGT) method and/or a bi-directional AGT (BIAGT) to be biased against deviation from the coarse path. These methods can be adapted to biased search exploration based on tree construction principles better suitable for limited memory resources.

For example, both the AGT and BIAGT methods expend the tree with an edge selected from a predefined set of primitive motions. Such a selection can be adapted to follow, i.e., track, the coarse path unless the tracking is infeasible, and/or to select such a primitive motion that reduces the cost deviation.

Different embodiments use different techniques for constructing the tree defining the refined path suitable for motion planning. For example, some embodiments extend the tree with edges defining kinematically feasible motions selected from a predefined set of primitive motions. In such a manner, the problem of searching for kinematically feasible section of the path reducing the cost deviation is reduced to the problem of selecting the motion primitive from the set to reduce cost deviation.

Different embodiments use different techniques to select such a motion primitive. For example, one embodiment defines different modes of tree expansion and for different modes different kinds of motion primitives can be selected to decrease the cost deviation. The mode can be selected based on a distance between a current state defined by the current node and the target state and layout of collision free space surrounding the vehicle in the current state. This is because the more freedom the vehicle has the better choices the vehicle has to track the coarse path. Conversely, if the space surrounding the vehicle is tight, the vehicle should be given more freedom to test different motion primitives.

Some embodiments use modes such as a navigation mode, a normal mode, and a parallel parking mode. For example, a tree starts with parallel parking mode if the initial tree node (t-node) represents a vehicle state with tight front and rear free space; a tree starts with navigation mode if the initial t-node represents a vehicle state in an open driveway as well as at a certain distance away from a parking spot (designated by its target t-node); otherwise the tree starts with a normal mode. Transition from parallel parking mode to normal happens if the t-node of the tree chosen for t-node expansion has relatively large front and rear space; transition from navigation to normal happens if the t-node of the tree chosen for t-node expansion enters a certain neighborhood of the target t-node of the same tree.

Additionally, or alternatively, some embodiments select and expend nodes of the tree based on the cost of the nodes determined not with respect to the target or initial state of the vehicle but with respect to the target or initial waypoints of the coarse path. Because the coarse path represents the shortest path connecting the initial with target waypoints, it has the smallest cost for such a connection. Hence, if the cost of the coarse path is represented with respect to the target or initial waypoints the nodes of the tree as selected on the coarse path when possible or selected to return to the coarse path with less deviation.

In such a manner, the waypoints of the coarse path serve three roles in disclosed motion planning of some embodiments referred to as RP-BIAGT: 1) the path length from a waypoint to the corresponding goal is used as a heuristic that guides the BIAGT search; 2) the heading of the waypoint closest to the parking space guides BIAGT to get out in the correct direction; 3) the heading of waypoints on the straight section of the driveway are utilized to trim available motion primitives for BIAGT in order to avoid unnecessary steering motions and also reduce the number of nodes required to find a feasible trajectory.

In addition to addressing the memory burden in the long-horizon motion panning problem, some embodiments are based on understanding that when a parking path for a vehicle is sufficiently long and happen in a public space, it is possible that new unaccounted obstacles can appear to prevent following the refined path. In such satiations, the refined path should be either repaired or replaned. Some embodiments are based on another realization that there is a need for a test to decide when the refined path can be repaired or when there is a need to determine a new refined path from scratch.

Some embodiments are based on realization that a clearance defying a collision free space to get around an obstacle can be used as such a test. When the clearance is too low, the motion plan should be redone. When the clearance is big enough, the motion plan can be repaired. The clearance can be determined, e.g., by geometrical shifts of the vehicle. For example, some embodiments compare the clearance with a clearance threshold to make a repairing decision. Additionally, or alternatively, some embodiments trained a function to evaluate the clearance and to output the repairing decision.

In such a manner, some embodiments adopt a hierarchical framework to fulfill a repairing and replanning procedure where geometric shifting is first conducted to identify a set of collision-free waypoints, and then dynamically feasible trajectories are obtained with the heuristic guidance from the shifting outcome. This not only improves the computational efficiency but also provides a convenient criterion to decide between trajectory repairing and replanning.

In addition to providing the maximum clearance for the repairing difficulty test, these geometric shifts also help the repair planner with heuristic guidance. When the repairing criteria are satisfied, the median of the collision-free shifts for each collision node can be used instead of the original route planner waypoints for heuristic calculation.

Some embodiments realize that it is disadvantageous to expand node in all direction (by applying all control actions), which suffers from similar drawbacks as probabilistic approaches using uniform sampling. This invention further presents a tree construction method by conducting selectively expansion according to the surrounding of the vehicle. Specifically, when the vehicle has tight free space in its front and rear ends, the tree grows in a parallel parking mode; if the vehicle is far from the parking spot, the tree runs in a navigation mode; otherwise, the tree runs in normal parking mode. Given that the tree runs in different modes, different sets of motion primitives will be used during the node expansion. This scheme ends up with fewer motion primitives in navigation mode, more motion primitives in parallel parking mode, compared against in normal mode. It typically ends up with a tree with lower complexity: fewer nodes and edges.

BRIEF DESCRIPTION OF THE DRAWINGS

FIG. 4B shows a block diagram of a method performed by the route planner according to one embodiment.

DETAILED DESCRIPTION

It is an object of some embodiments to disclose a path and/or motion planning method that allows real-time path generation for automated vehicle control. It is another object of some embodiments to disclose a motion planning method that allows real-time automated vehicle control, e.g., suitable for automated parking system and method. For clarity purposes only, some embodiments are described in relation to automated parking scenarios. However, principles explained in relation to parking scenarios are used by alternative embodiments in other automated vehicle control applications.

Figure 1A:
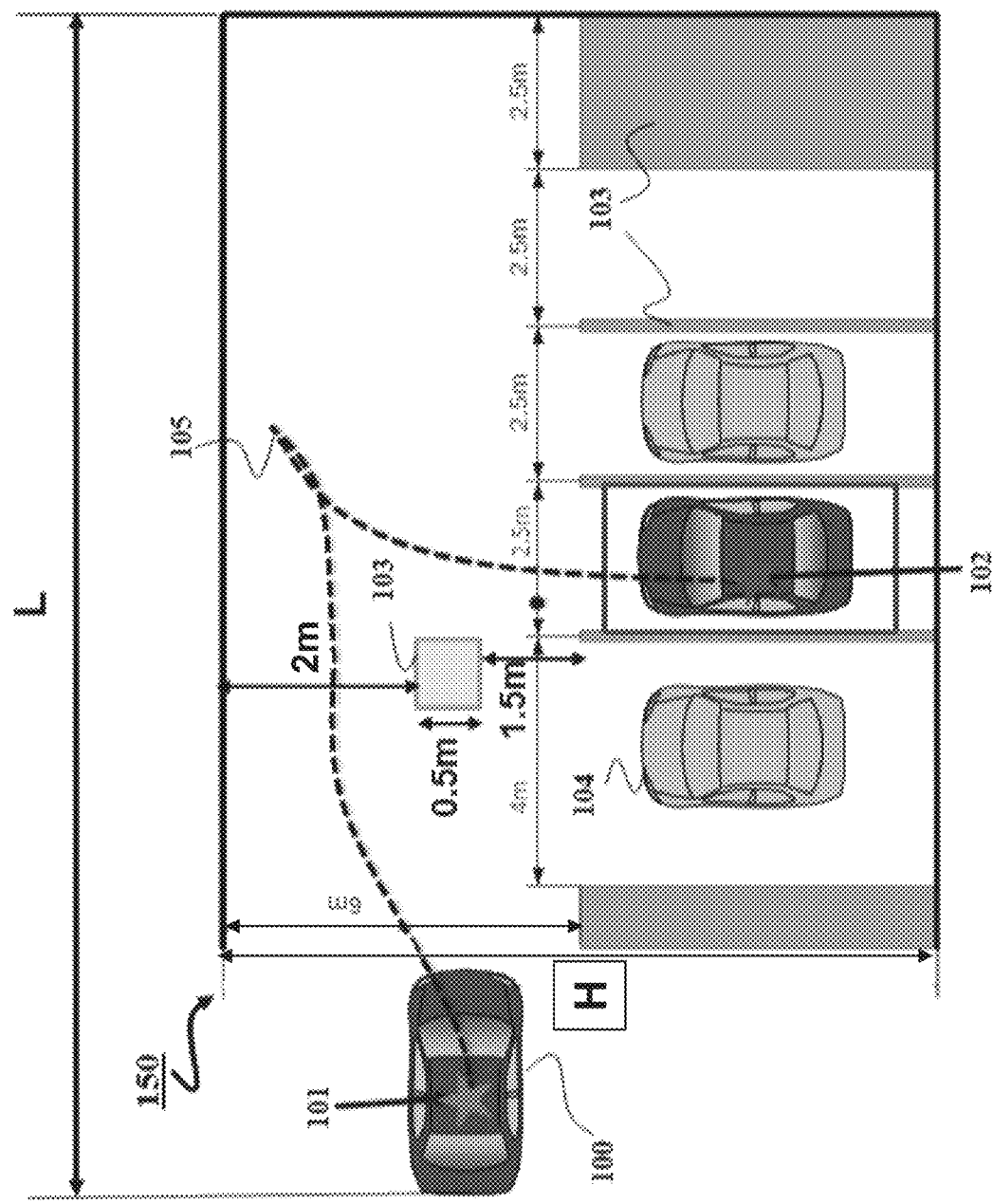
FIG. 1A shows an example of a parking scenario addressed by some embodiments.

FIG. 1A shows an example of a parking scenario addressed by some embodiments. In this example, the boundary of a parking space 150 is represented by a rectangle with a size of L×H. The vehicle 100 has an initial state 101 and needs to be parked at a parking spot defined by a target state 102. Each state, e.g., the initial and the target state, defines position and orientation of the vehicle. This invention can consider two different types of tasks: tasks with start state on the driveway and target state in a parking spot (referred to as parking-in tasks), and tasks with start state in a parking spot and target state on the driveway (referred to as driving-out tasks). The parking space 150 includes obstacles. The obstacles can be part of the layout of the parking space, i.e., permanent obstacles 103, such as walls and/or columns of the parking space, as well as temporary obstacles 104 such as other vehicles on road. Dimensions of the permanent obstacles are usually known, or can be estimated to a reasonable extent. FIG. 1A depicts non-limiting examples of such dimensions.

Additionally, or alternatively, obstacles can include other parked or moving vehicles 104. Geometrical dimensions of the vehicles 104 and the vehicle 100 to be parked can be determined based on the type of the vehicle. For clarity, this disclosure considers a front wheel drive vehicle; although different embodiments are applied to other vehicles including rear wheel drive and full wheel drive vehicles.

In some embodiments, the layout of the parking space and position of the obstacles 103 are specified on the map of the parking space. Such a map can be predetermined or constructed in real time during or before the parking task. Various embodiments determine a kinematic path 105 connecting the initial state and the target state such that the kinematic path is feasible and collision free.

Figure 1B:
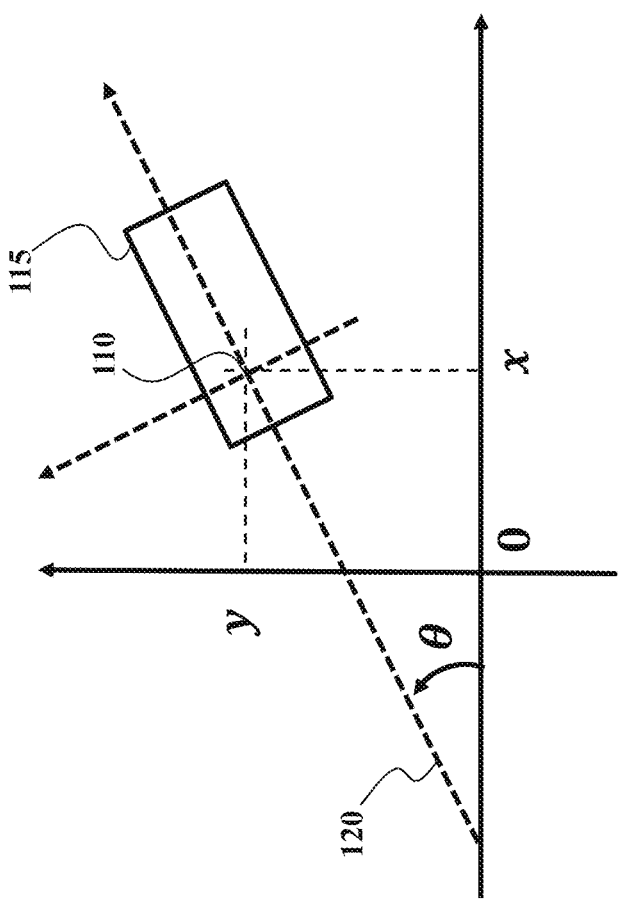
FIG. 1B shows an exemplar schematic of geometrical representation of a vehicle according to some embodiments.

FIG. 1B shows an exemplar schematic of geometrical representation of a vehicle according to some embodiments. In this example, the vehicle is abstracted as a rectangle 115. The vehicle state includes the position (x, y) 110, which represents the midpoint of its rear wheel axis, and the orientation θ 120, which denotes the angle between the vehicle body axis and the horizontal axis. The orientation defines the heading of the vehicle as pointed by the arrow 120 of the vehicle body axis. In some embodiments, the combination of the position and orientation of the vehicle is referred to as a configuration of the vehicle.

In some embodiments, path planning for automated vehicle control aims to solve the following problem. Given an initial configuration $X_0 \in C_{free}$, a goal or target configuration $X_f \in C_{free}$, and system (Equation 1), find a collision free kinematically feasible path P, which (1) starts at $X_0$ and ends at $X_f$; (2) lies in the collision-free configuration space $C_{free}$; and (3) satisfies the system kinematics (Equation 1).

Let J(•) be a cost function that assigns to each non-trivial path a non-negative cost. Optimal path planning is to find a collision free kinematically feasible path $P^*:[0,1] \to C_{free}$ that minimizes J(•). For the path planning, some embodiments use a kinematic model of the vehicle that describes the motion of the vehicle without consideration of the mass of the vehicle or the forces that caused the motion. In one embodiment, the following kinematic model is considered $\dot{x} = \cos(\theta) u_1$ $\dot{y} = \sin(\theta) u_1$ $\dot{\theta} = u_1 u_2,$ (1)

where $u_1 = \cos(\zeta)v$ the velocity of the midpoint of the rear wheel axis (named after longitudinal velocity of the vehicle), $u_2 = \tan(\zeta)/b$, and b the distance between (x, y) and the midpoint of the front wheels. Without loss of generality, $u_2$ is referred as a (normalized) steering angle. The kinematic model (1) can be slightly modified to account for minimum turning radius.

Collision-free configuration space $C_{free}$ is difficult to represent explicitly (in analytical expressions). However, given an environmental map including the boundary of the parking space and a list of obstacles and their geometric information, it is straightforward to verify whether a configuration belongs to $C_{free}$, and hence the environmental map can be viewed as an implicit representation of $C_{free}$.

In some embodiment, the environmental map includes information about the layout of the parking space as well as the position and geometric properties of the obstacles. The layout of the parking space or the position of some obstacles might not be completely known to the automated vehicle control system. Automated vehicle control system however continuously receives updated information about the layout of the parking space and obstacles from onboard mapping and localization system.

Motion planning, which determines how fast the vehicle moves along the path, uses a dynamic model of the vehicle 100. As used herein, a dynamic model of a vehicle accounts for time-dependent changes in the dynamic state of the vehicle. Dynamic models typically are represented by ordinary differential equations. Different embodiments can use different types or combinations of differential equations. For example, in one embodiment, the dynamic model of the vehicle includes five first-order ordinary differential equations $\dot{x} = \cos(\theta)\cos(\zeta)v$ $\dot{y} = \sin(\theta)\cos(\zeta)v$ $\dot{\theta} = \sin(\zeta)v/b$ $\dot{v} = a_v$ $\dot{\zeta} = a_s,$ (2)

where v the velocity of the front wheels, ζ the angle between the front wheels and the vehicle orientation (also referred to as steering angle), $a_v$ the translational acceleration, and $a_s$ the steering angular velocity. Generally, cos ζv equals to longitudinal velocity $u_1$ in (1), and tan ζ/b is related to $u_2$ (1).

A path is kinematically feasible if it is a solution of the kinematic model (1). A vehicle state X=(x, y, θ) is collision-free only if the vehicle located at X does not collide with any obstacle inside the environmental map, and lies completely inside the boundary 105. All collision-free vehicle states constitute a collision free configuration space $C_{free}$. The initial state 101 is abbreviated as $X_0 = (x_0, y_0, \theta_0)$, and the target state 102 is denoted by $X_f = (x_f, y_f, \theta_f)$. For a specific parking task with a parking space represented by a rectangle L×H, the vehicle state always belongs to a state space X:[0, L)×[0, H)×[0,2π).

In such a manner, different embodiments can be applied to both the kinematic model and the dynamic model. Without loss of generality, the following description is developed on the basis of the kinematic model.

A tree T is a union of a t-node set $V \subset C_{free}$ and a t-edge set E, i.e., T=(V, E). Without causing confusion, t-node, configuration, and vehicle state are used interchangeably below. A t-edge $E(X_i, X_j) \in E$ represents a collision free kinematically feasible path between nodes $X_i$ and $X_j$. For a finite set V, |V| denotes the number of its elements.

A graph G is a union of a node set $V \subset C_{free}$d and an edge set E, i.e., G=(V, E). An edge $E(X_i, X_j) \in E$ represents the existence of a collision free path between nodes $X_i$ and $X_j$. A directed graph is a special class of graph where its edge bears direction information, for instance an edge $E(X_i, X_j)$ permits the movement from $X_i$ to $X_j$, but not the opposite.

Some embodiments determine whether a vehicle state is without collision based on a geometric representation of the parking space, which is also referred to as a map of the parking space. In some embodiment, the map of the parking space is derived by approximating all obstacles and the boundary of the parking space as simple geometric shapes. In one embodiment, obstacles 103 in the environment (equivalently the parking space) can be approximated as rectangles, which are derived by constructing a minimal bounding box for each obstacle. With geometric approximation of obstacles and boundary of the parking space, the parking space or the environment can be fully described by a list of geometric objects. In another embodiment, the map of the parking space is represented as a group of grids, which are marked as occupied or unoccupied. Both representations of the map can be exploited to determine whether a vehicle at a certain configuration is collision-free or not.

Figure 1C:
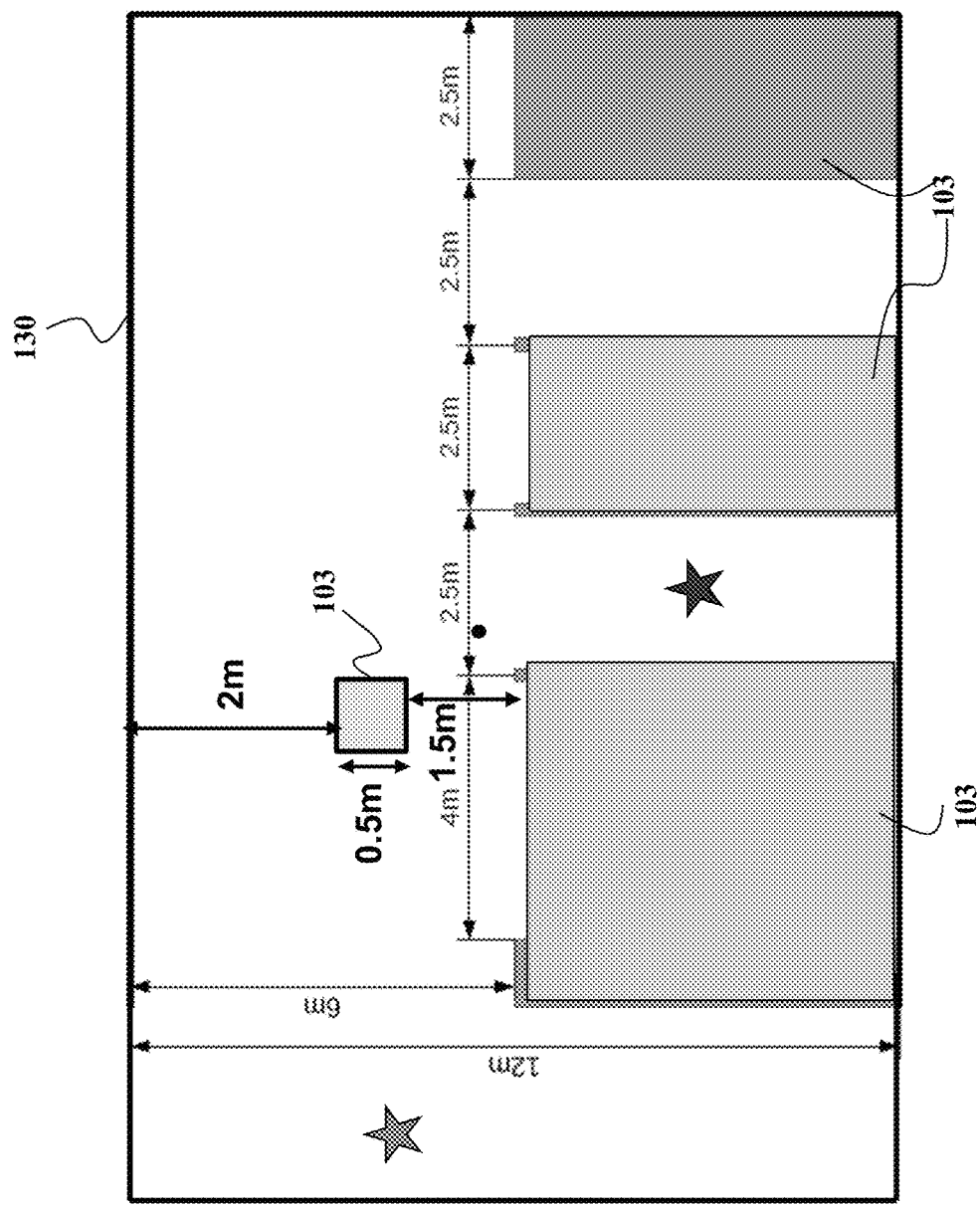
FIG. 1C shows a map of a parking space corresponding to the parking scenario of FIG. 1A.

FIG. 1C shows a map 130 of a parking space corresponding to the parking scenario of FIG. 1A. Both types of obstacles are merged together as one type of permanent obstacles 103 using a rectangular representation. An obstacle can be approximated by multiple geometric shapes, depending on computing power of an onboard processor for path planning. For instance, in another embodiment, obstacles can be approximated by constructing a bounding circle for each obstacle if the computing power is not sufficient. Alternatively, an obstacle can be approximated by a polytope, which however may increase the computation burden in path planning. Also, obstacles in the parking space might not be approximated by the same geometric shape. In some embodiments, the environmental map is decomposed into a group of cells, each of which corresponds to a configuration and its neighborhood with a certain volume. Cells could have different volumes. Obstacles in the parking space can be represented by a group of cells.

Figure 2A:
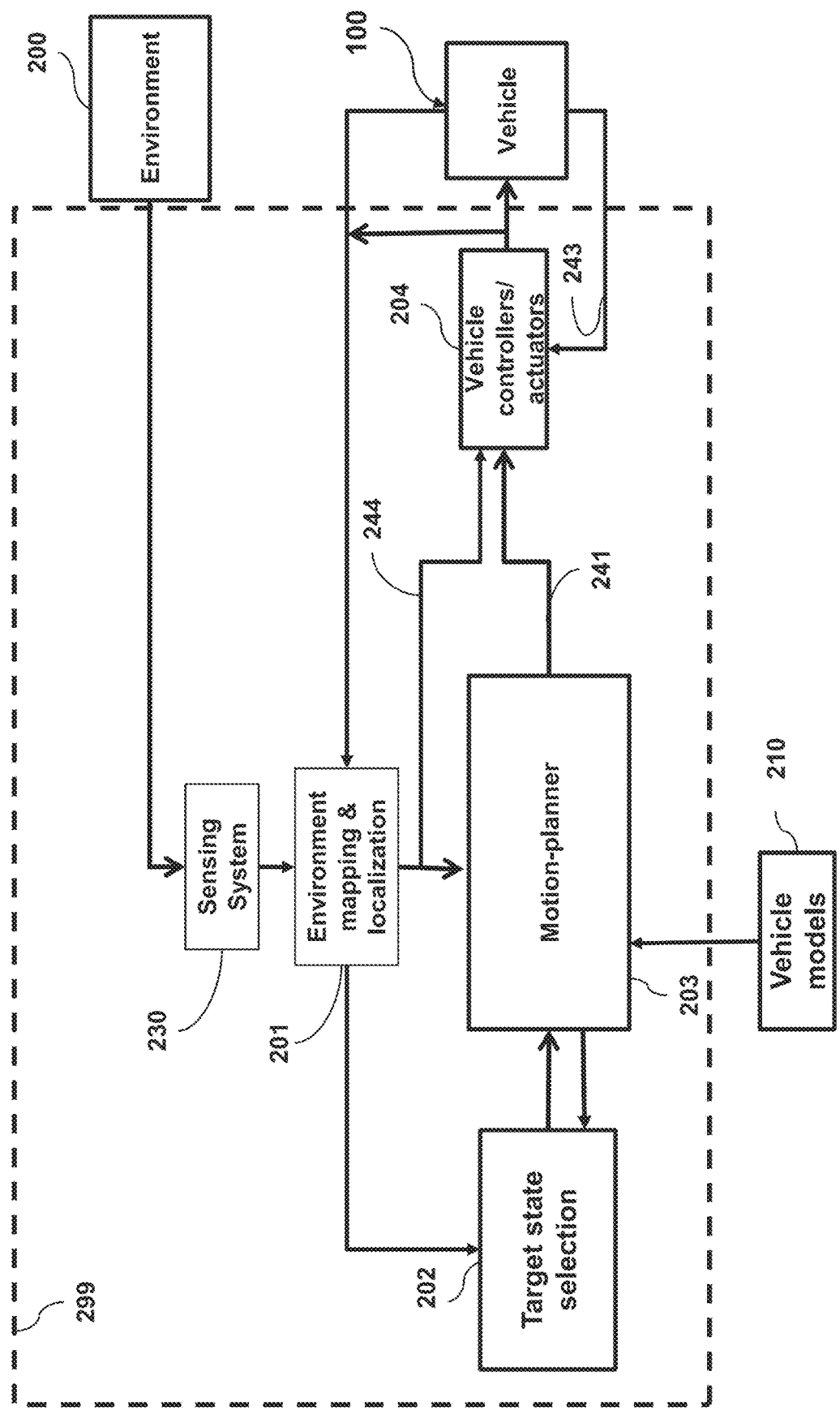
FIG. 2A shows a function diagram of automated parking system according to one embodiment.

FIG. 2A shows a function diagram of an automated parking system according to one embodiment. Environment mapping and localization block 201 constructs or updates the map of the parking space, and determines the current location of the vehicle by sensing the environment and vehicle operation condition using a sensing system 230. For example, an inertial measurement unit (IMU), which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 200 can be video cameras capturing obstacles including other vehicles, pedestrians, and buildings, ultrasonic/radar and LiDAR sensors detecting distance between the vehicle and obstacles, etc. In one embodiment, the environment map is further processed to generate a geometric representation of the parking space as shown in FIG. 1C.

Target state selection block 202 selects a target state for a parking spot to park the vehicle by identifying parking lot candidates, and submits the target state to a motion planning block 203. In one embodiment, the available parking spots are tracked by a separate system associated with the management of the parking garage. Additionally, or alternatively, the parking spots can be detected using the sensors 203 of the automated parking system. In one embodiment, the motion planning block checks to determine whether the target state is parkable, i.e., there is a feasible path to the parking spot, or not, and notifies the target state selection block 202 the check result. If the target state is not parkable, the target selection block 202 selects another target state for evaluation. In another embodiment, the target state selection block 201 can also evaluate whether the target state is parkable, and only sends a parkable target state to the motion planning block.

If the target state is parkable, then the motion planning 203 initiates a complete motion planning procedure to determine a reference trajectory 241 based on the vehicle models 210, the initial and target states of the vehicle, and the map of the parking space. In one embodiment, the reference trajectory defines profiles of the vehicle velocity and steer angle over time. In another embodiment, the reference trajectory defines the profile of the vehicle state (x, y, θ) as well as the vehicle's longitudinal velocity v and steering angle over time. In most of cases, the reference trajectories various forms are equivalent and can determine each other using the vehicle model.

Given the reference trajectory 241, vehicle controllers and actuators 204 determine and exert control commands to enforce the vehicle state track its reference trajectory 241. In one embodiment, the control commands could be gas pedal pressure and/or steering torque. The vehicle controller/actuators may use signal 243 and 244 to determine control commands. The signal 243 can be a measured steering angle, or measured currents of motors moving the steering wheel or the gas pedal, the output of the IMU, and the current state of the vehicle estimated by the localization block 201.

Figure 2B:
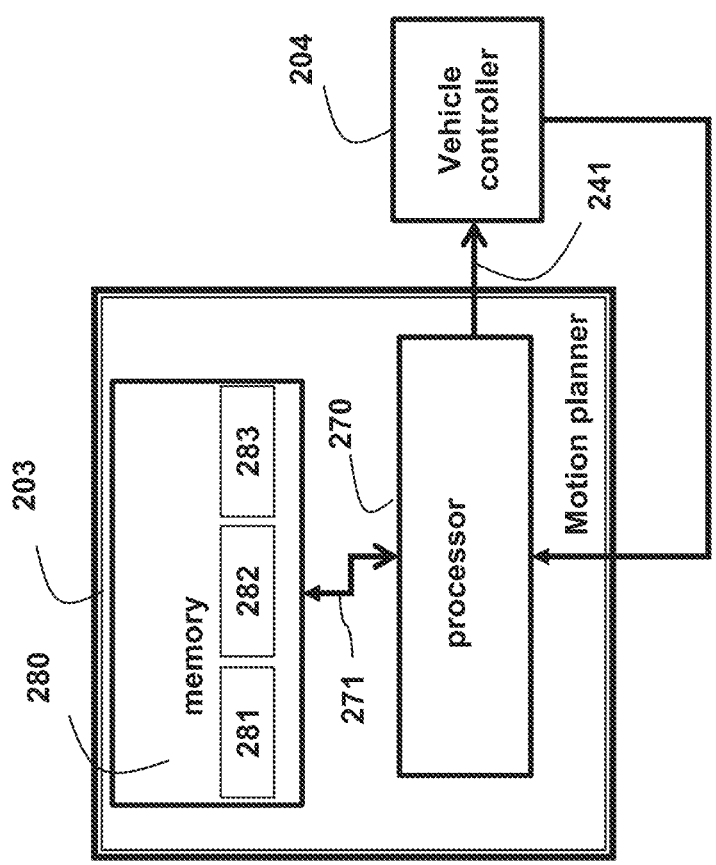
FIG. 2B shows a general structure of the motion-planning system according to one embodiment.

FIG. 2B shows a general structure of the motion-planning system 203 according to one embodiment. The motion-planning system 203 includes at least one processor 270 for executing modules of the motion-planning system 203. The processor 270 is connected 271 to a memory 280 that stores geometrical information 281 such as geometry of the vehicle and a map of the parking space. The memory 280 can also store the models of the vehicle 282 such as a kinematic model of the vehicle and a dynamic model of the vehicle. The memory 280 can also store the internal information 283 of the motion planner, including, but not limited to, an initial state of the vehicle, a target state of parked vehicle, cost function, values of each computed state, the motion leading up to each state, a directed graph representing a traffic network capturing connectivity and permitted traffic flow information of the parking space, a geometric graph, a kinematic graph, waypoints, reference trajectory, pre-selected control actions, pre-computed motion trajectories, etc. In some embodiments, the memory 280 can include stored instructions implementing the method for the automated parking, wherein the instructions, when executed by the processor 270 carry out at least some steps of the method.

Some embodiments are based on the recognition that various planning algorithms can be used for autonomous parking including, to name a few, graph-based A* and D* methods, continuous approaches involving navigation function and potential fields, sampling-based method such as probabilistic roadmaps (PRM), expansive-space trees, rapidly-exploring random trees (RRT), optimal variants RRT* and probabilistic roadmap (PRM*); anytime RRT, and A-search guided tree (AGT). All these planning algorithms can be used to explore the parking space using different principles adopted by different planning algorithms. For example, RRT method uses sampling to explore the parking space, while AGT expands trees with edges formed by predefined expansion primitives.

Different planning algorithms can be advantageous in one parking scenario and suboptimal in another one. However, all these planning algorithms suffer from a dimensionality problem. Specifically, the planning algorithms are typically poorly scaled to search big parking space. Indeed, for relatively small parking space of private garages, different kinds of planning algorithms can be efficiently used. However, if the parking problem is extended to a multi-floor garage or to a parking lot of a supermarket, the exploration problem becomes too big for most motion planners to satisfy memory requirement of various control systems, such as embedded advanced driver-assistance systems (ADAS). Such a problem is referred herein as a long-horizon motion panning problem.

Some embodiments are based on the realization that the long-horizon motion planning problem can be addressed by replacing a single principle of a planning algorithm with hybrid principles exploring the search space first in a coarse manner and then in a more refined manner, Some embodiments are based on the realization that the principles of coarse exploration can be different from the principles of refined explorations, because they have different objectives. Indeed, the "long-horizon motion panning problem" can be partitioned into two problems including (1) long-horizon and (2) motion planning. Hence, the objective of coarse explorations is to search the space over a long horizon even if the results of exploration are not suitable for motion without additional adaptation. In contrast, the refined exploration should focus on the motion planning part without a need to worry about the long horizon aspect of the planning.

Some embodiments are based on the realization that the coarse exploration can be efficiently determined in a more deterministic manner over a predefined data structure representing a layout and/or traffic network within a parking space in a search efficient manner. Example of such a structure is a directed graph that includes waypoints connected by edges. In such a data structure, each waypoint defines a position and an orientation for the vehicle to move along the directed graph, and each edge defines collision free path for the vehicle from one waypoint to a next waypoint in the directed graph. Such a directed graph can be kinematically feasible or infeasible. An infeasible directed graph can be more easily defined using just the geometry of a vehicle, but still be an efficient tool in coarse exploration of a search space over a long-horizon, because the directed graph can be searched over a significant depth in a computationally efficient manner.

For example, in some embodiments, to park a vehicle or to move a vehicle from an initial state to a target state, the coarse path is a shortest path on the directed graph connecting an initial waypoint on the directed graph closest to the initial state of the vehicle with a target waypoint on the directed graph closest to the target state of the vehicle. Additionally, or alternatively, the coarse path can be selected subject to constraints such as heading constraint introduced to down-select initial/target waypoint candidates. Notably, the search space of coarse exploration is limited to the space of the directed graph and thus computationally efficient. However, this efficiency has its price. For example, the position and orientation of an initial waypoint can be different from the position and orientation of an initial state of the vehicle. Similarly, the position and orientation of a target waypoint can be different from the position and orientation of a target state of the vehicle. Hence, the coarse path usually does not connect the initial state with the target state of the vehicle. In addition, depending on the construction of the directed graph, the coarse path may not be kinematically feasible and cannot be used for motion planning without further adaptations. However, the construction of the coarse path through predefined search space of the directed graph is very efficient even over a long-horizon, e.g., over 50, 100 or even 1000 meters.

In contrast to the coarse path, the objective of the refined path is to focus on feasible motion planning while disregarding the extent of the long-horizon part of the motion planning; problem. Some embodiments are based on realization that such an objective can be achieved if the refined plan is built as a motion plan for feasible collision free motion with a cost having the reduced, e.g., the smallest, deviation from the cost of the coarse path. Under this constraint, the refined path will tend to track the coarse path taking an advantage from the long-horizon exploration, with three notable exceptions. The first exception is the need for connecting the initial state of the vehicle with coarse path in a cost-efficient manner, the second exception is the need for connecting the coarse path with the target state in a cost-efficient manner, and the third exception is the need for providing cost effective modification for motion infeasible sections of the coarse path. Because over the long-horizon, the coarse path is mostly feasible, the refined path focuses on these relatively small exceptions. In effect, the hybrid space exploration reduces the exploration of the new areas for the refined motion planning to neighborhoods of initial and target states of the vehicle as well as neighborhoods of some turns and/or obstacle avoidance. This search space is usually much smaller than the original search space and can be efficiently explored even by embedded systems with limited computational and memory capabilities.

Figure 3:
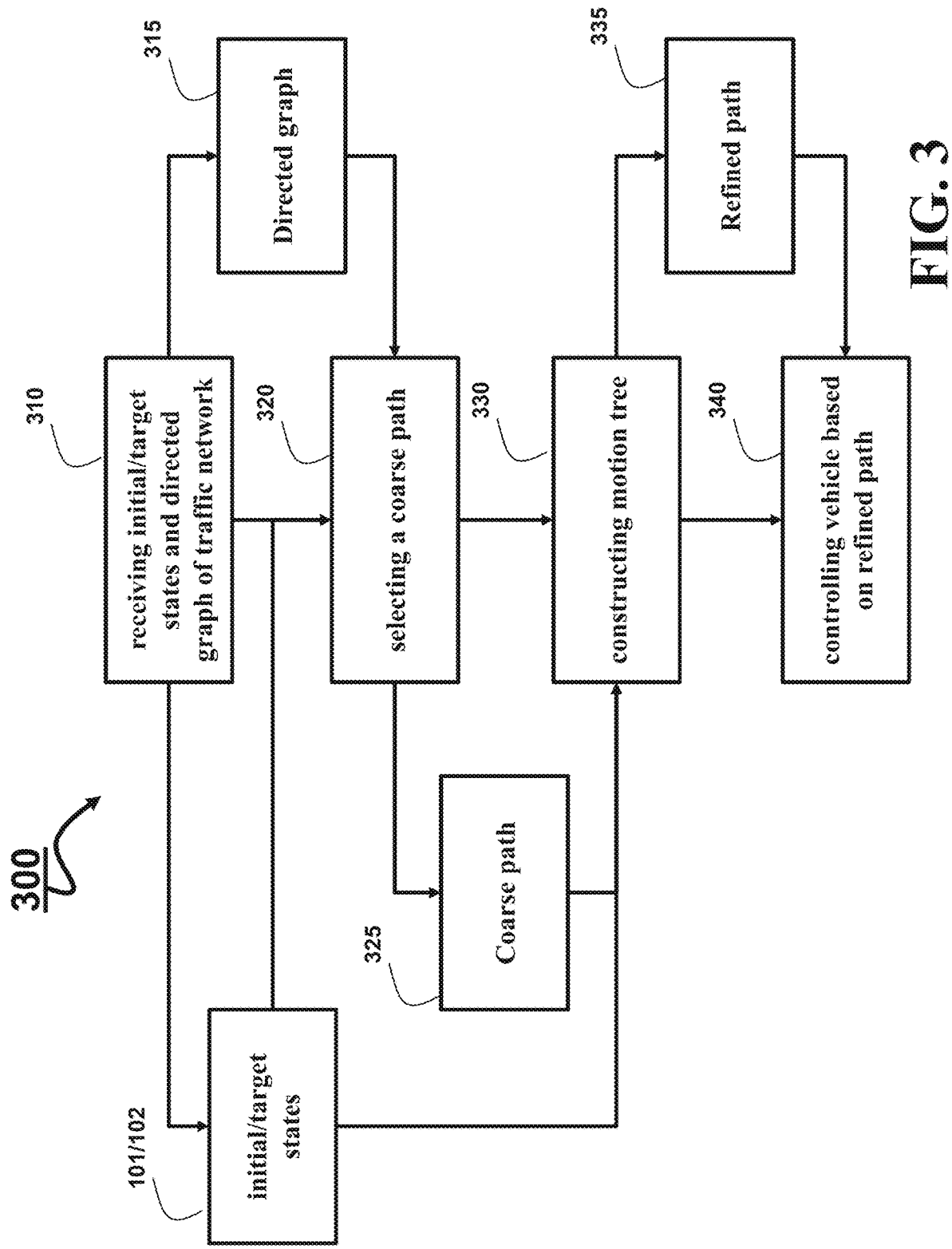
FIG. 3 shows a block diagram of a method for parking a vehicle within a parking space according to some embodiments.

FIG. 3 shows a block diagram of a method 300 for parking a vehicle within a parking space according to some embodiments. The method can be implemented by a system 299 using at least one processor, such as a processor 270, and a memory, such as the memory 280, having instructions stored thereon that, when executed by the at least one processor, implements the steps of the method.

Additionally, or alternatively, the method 300 can be implemented by a parking management system remote to the vehicle. In these embodiments, the parking management system determines the motion plan and submits it to the vehicle for the execution.

Accordingly, the method 300 includes receiving 310 an initial state 101 of the vehicle in the parking space defining an initial position and an initial orientation of the vehicle, a target state 102 of the vehicle in the parking space defining a target position and a target orientation of the vehicle. Receiving 310 a directed graph 315 representing a traffic network within the parking space. The directed graph includes waypoints connected by edges, each waypoint defines a position and an orientation for the vehicle to move along the directed graph, each edge defines a collision free path for the vehicle from one waypoint to a next waypoint in the directed graph.

The received information can be generated by modules of the vehicle and/or received over wireless communication channels. For example, the initial state of the vehicle including, e.g., a position and an orientation of the vehicle, can be received from navigation system of the vehicle. Additionally, or alternatively, the initial state of the vehicle can be received from a parking management system over the wireless communication channel. The target state and the directed graph can also be received from the parking management system.

The method 300 includes selecting 320 a coarse path 325 defined by a shortest route of waypoints connecting an initial waypoint on the directed graph closest to the initial state of the vehicle with a target waypoint on the directed graph closest to the target state of the vehicle. For example, multiple waypoints can be considered as the closest from Euclidean point of view to the initial and/or target state of the vehicle. Making the coarse path the shortest can clarify this ambiguity and also reduce memory requirements of path planning. Additionally, or alternatively, the initial waypoint and the target waypoint may be selected to provide the shortest coarse path subject to a heading constraint, such that the difference between the orientation of the vehicle and the orientation of the initial waypoint or the target waypoint is below a certain threshold.

The method 300 includes constructing 330 a tree having multiple nodes defining different states of the vehicle including an initial node defining the initial state of the vehicle and a target node defining the target state of the vehicle, Each pair of nodes in the tree is connected with an edge defined by kinematically feasible motion moving the vehicle between the states of the connected nodes without a collision. The tree is constructed to reduce a deviation of a cost of a motion defined by a refined path 335 connecting the initial node with the target node of the tree from a cost of the coarse path defining the route of waypoints Having the refined path 335, the method 300 includes controlling 340 the vehicle based on the refined path. For example, the system 299 can generate a sequence of control commands to the actuators of the vehicle to track the refined path according to dynamic model of the vehicle.

Some embodiments are based on recognition that different types of motion planning algorithms can be adapted to construct a tree defining the refined path. Such an adaptation can be based on optimization principles as well as based principles of construction. For example, some embodiments adapt an A-search guided tree (AGT) method and/or a bi-directional AGT (BIAGT) to be biased against deviation from the coarse path. These methods can be adapted to biased search exploration based on tree construction principles better suitable for limited memory resources.

For example, both the AGT and BIAGT methods expend the tree with an edge selected from a predefined set of primitive motions. Such a selection can be adapted to follow, i.e., track, the coarse path unless the tracking is infeasible, and/or to select such a primitive motion that reduces the cost deviation.

Different embodiments use different techniques for constructing the tree defining the refined path suitable for motion planning. For example, some embodiments extend the tree with edges defining kinematically feasible motions selected from a predefined set of primitive motions. In such a manner, the problem of searching for kinematically feasible section of the path reducing the cost deviation is reduced to the problem of selecting the motion primitive from the set to reduce cost deviation.

For example, some embodiments disclose route planning BIAGT (RP-BIAGT) to plan the route defined by a coarse path of waypoint and performed the BIAGT biased toward the coarse path to arrive on the refined path.

Figure 4A:
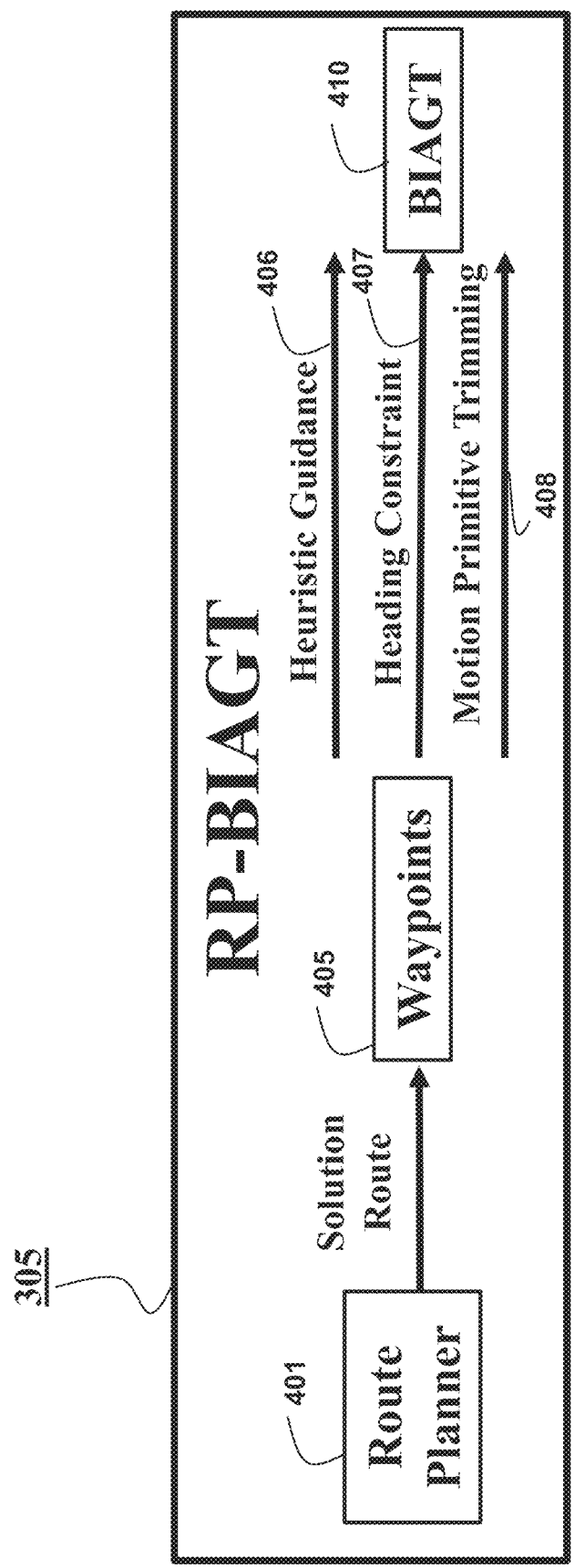
FIG. 4A shows a schematic of an exemplar implementation of RP-BIAGT according to some embodiments.

FIG. 4A shows a schematic of an exemplar implementation of RP-BIAGT 305 according to some embodiments. A route planner 401 determines a solution route based on a traffic network characterizing the connectivity of the parking space and admissible traffic flows. The solution route is represented as a sequence of waypoints 405. The waypoints are sent to into BIAGT 410 and are harnessed as in three aspects: heuristic guidance 406, heading constraint 407, and motion primitive trimming 408.

In some embodiments, the traffic network has a representation of a directed graph, which includes a set of nodes for milestone collision-free configurations, and a set of edges, each of which indicates the existence of a collision-free path between two associated nodes. Milestone nodes represent, but not limited to, entrances, exits, intersections of the parking space. Traffic flows could be one-way, two-way, U-turn, etc.

FIG. 4B shows a block diagram of a method performed by the route planner 401 according to one embodiment. The route planner 401 determines the solution route on the basis of a traffic network 411 and initial/target states of the vehicle provided in configuration 300. At first, the traffic network is refined 415 as a dense directed graph 416. Based on the initial and target states of the vehicle 101/102, and the dense directed graph 416, initial and target waypoints are identified 420 for route planning.

Some embodiments are based on understanding that density of waypoints in the directed graph can affect minimization of the cost deviation between the refined and coarse paths. For example, with sufficient density defining distance between neighboring waypoints, the more cost-effective connection from the initial state of a vehicle to the coarse path may not be to the initial waypoint of the coarse path but to a subsequent waypoint. To that end, some embodiments, after capturing milestone waypoints of the parking space defining entrances, exits, intersections and turns within the parking space, increase the resolution of the directed graph by adding more intermediate waypoints connecting the milestone waypoints. In some implementations, the distance between neighboring waypoints in the directed graph is less than a threshold. The threshold can be defined based on geometry of an average vehicle, geometry of parking spots of the parking space, layout of the parking space, and combination thereof.

Given the initial and target waypoints 420, and the dense directed graph 416, any graph search algorithm such as Dijkstra, A, and D algorithms, can be applied to find 430 a sequence of waypoints of the dense directed graph, such that these waypoints connect the initial waypoint to the target waypoint with permitted traffic flows.

In some embodiments, a waypoint contains information about the position and heading of a vehicle. Two waypoints connecting an edge shall have the similar heading or exactly the same heading, and the heading of the waypoint should be consistent with the direction of the related admissible traffic flow.

Figure 5A:
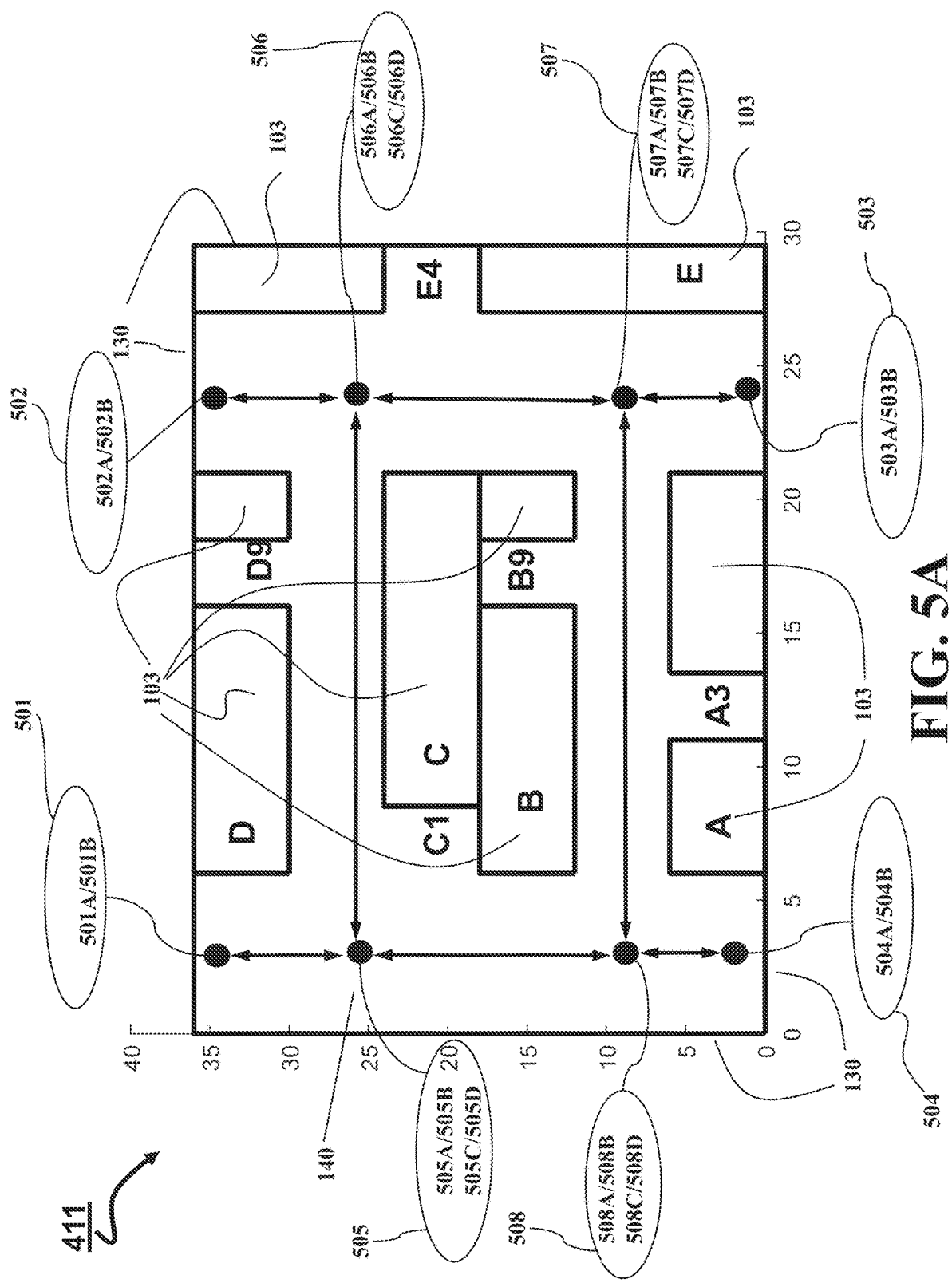
FIG. 5A shows a layout of an exemplar parking space and a schematic of representing the traffic network of the exemplar parking space using a directed graph according to some embodiments.

FIG. 5A shows a layout of an exemplar parking space and a schematic of representing the traffic network of the exemplar parking space using a directed graph according to some embodiments. In this example, the parking space includes four rows of perpendicular parking spots A, B, C, D, and one column of parallel parking spots E. The parking space is abstracted as a rectangle with boundary 130, and has five vacant parking spots, A3, B9, C1, D9, and E4, whereas all the other parking spots have been occupied. The parking space contains four entrances represented by four nodes 501, 502, 503, and 504; four intersections represented by four nodes 505, 506, 507, and 508; and four two-way driveways, 501-505-508-504, 502-506-507-503, 505-506, and 507-508. In contrast from a directed graph in 2-dimension plane where a node only possesses position information, a node in the directed graph of various embodiments contains heading information. The heading takes any value in a continuous interval $[0, 2\pi)$. Specifically, in various embodiments, the node contains heading information which matches the direction of its related traffic flows. For example, the entrance 501 is related to two traffic flows: downward traffic flow from 501 to 505 with a heading 270 degree, and an upward traffic flow from 505 to 501 with a heading 90 degree. This means 501 corresponds to two headings and induces two separate nodes 501A and 501B which share the same position but have two distinctive headings. Similarly, intersection 505 is associated with 6 traffic flows: two downward traffic flows from 501 to 505 and from 505 to 508 with a heading 270 degree, two upward traffic flows from 505 to 501 and from 508 to 501 with a heading 90 degree, 1 rightward traffic flow from 505 to 506 with a heading 0 degree, and 1 leftward traffic flow from 506 to 505 with a heading 180 degree. Hence, intersection 505 corresponds 4 nodes in the directed graph, e.g. 505A (downward), 505B (upward), 505C (rightward), and 505D (leftward). Accordingly, the edges involving nodes 501A, 501B, 505A, 505B, . . . ,505D are (501A, 505A), (505A, 505B,502B), (508B,505B), (505C, 506C), (506D,505D). Also for all nodes with the same position, as long as a transition between them is permitted, for example, transition from 505A to 505C involves a left turn, then an edge describing the transition is also added to the directed graph.

The method taught above to derive a directed graph from a practical traffic network can be generalized to treat parking space which contains various intersections, rotaries, and curved driveways. In some embodiments, a node of the directed graph includes position and heading parameterized under certain coordinates. Including the heading information could be advantageous in identifying initial and target waypoints which are closer to the initial and target states, and thus better guide the underlying parking path planner: bi-directional A-search guided tree (BIAGT).

Traffic network, represented as a directed graph in FIG. 5A, could be coarse in spatial resolution (the distance between any two nodes is too large), and thus cannot effectively guide the low-level parking path planner. With nodes being too distant from each other, and the initial and target waypoints being limited to the nodes of the directed graph, performing search algorithm over the directed graph with these initial and target waypoints ends up with a route whose initial and target waypoints are too far away from initial/target state of the vehicle. As a result, the route does not offer guidance between the initial/target waypoints of the route and the initial and target states of the vehicle.

Figure 5B:
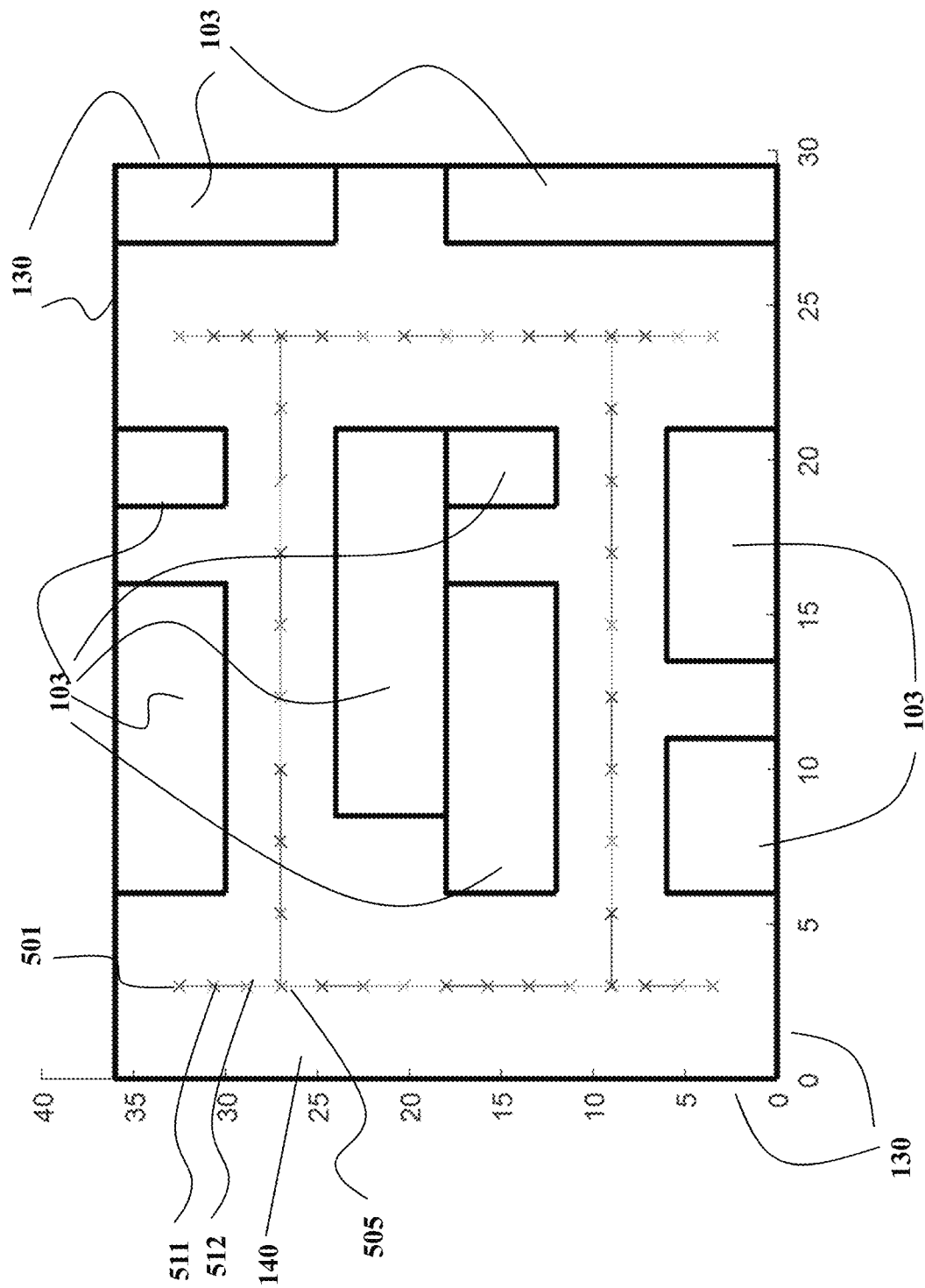
FIG. 5B shows a schematic of refining a directed graph of FIG. 5A according to some embodiments to produce a dense directed graph.

FIG. 5B shows a schematic of refining a directed graph of FIG. 5A according to some embodiments to produce a dense directed graph. As shown in FIG. 5B, the dense directed graph is obtained by dividing each edge of the directed graph into various short edges and introducing additional nodes to define these short edges. As an example, for the edge (501A,505A), the edge is divided into a variety of small edges (501A,511), (511,512), (512,505A), all of which connect in series. In addition to newly obtained edges, the division introduces two new nodes 511 and 512. The directed graph adds these newly obtained edges and the associated new nodes, and, notably, remove the edge (501, 505). Repeating the above process on all edges of the directed graph yields the dense directed graph, which presents only edges with a distance shorter than a specified threshold, and nodes which are more densely distributed in the parking space. Note that the dense directed graph is necessarily larger than the directed graph in terms of the number of nodes and edges, which results in higher requirement on memory and computation to determine a route. The increase in computation however is negligible compared with reduction of memory consumption and computation time of the low-level path planner BIAGT due to more effective guidance the refinement offers.

Figure 5C:
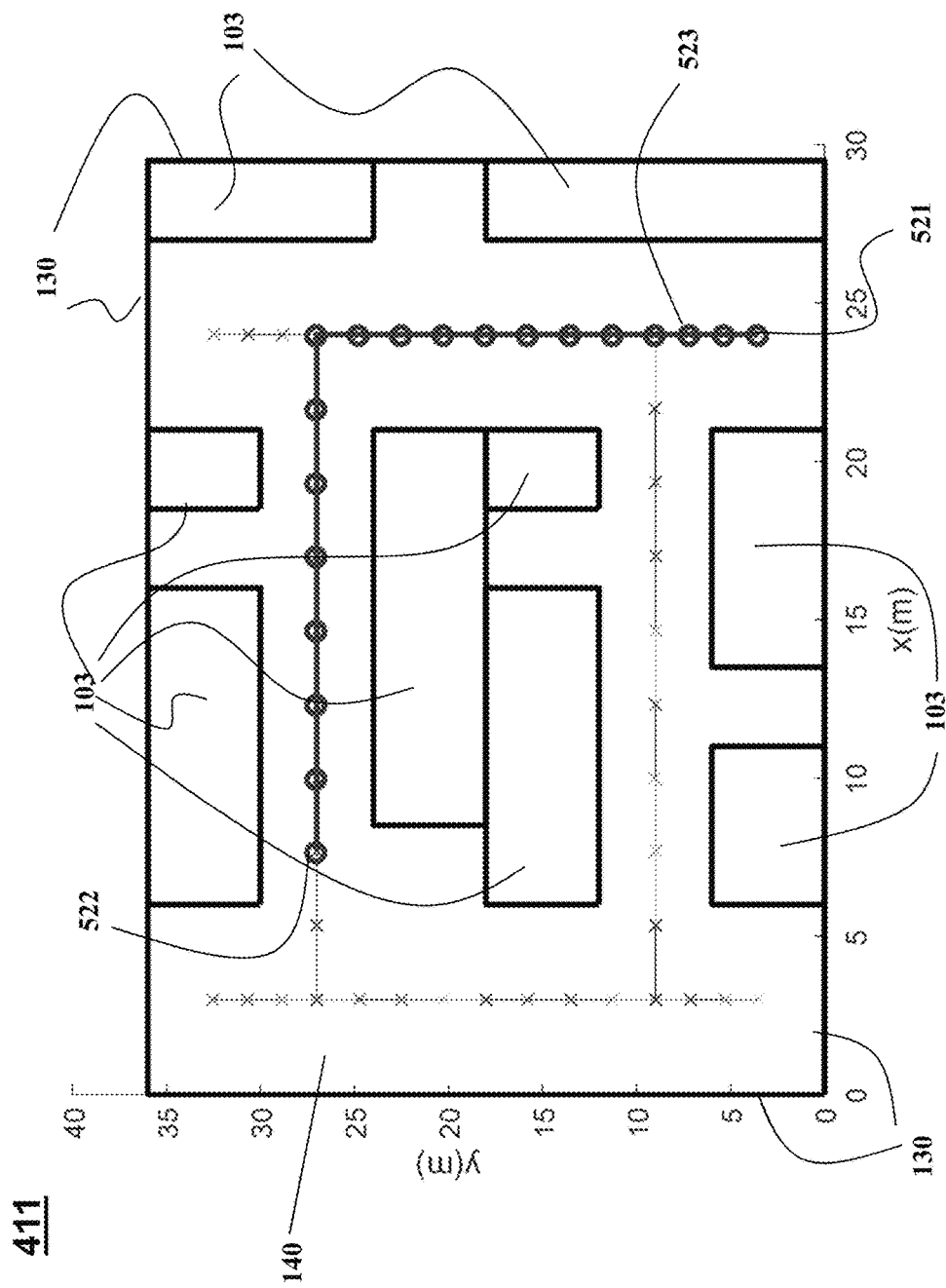
FIG. 5C shows a schematic of the route planer determining the coarse path based on the dense directed graph according to some embodiments.

FIG. 5C shows a schematic of the route planer determining the route (the sequence of waypoints) based on the dense directed graph according to some embodiments. As an example, for a parking task moving the vehicle from the lower-right entrance into parking spot C1, an initial waypoint 521 and a target waypoint 522 are identified by checking the distance between any node on the dense directed graph with the initial state and target state of the vehicle respectively. Some implementations employ a heading check procedure to ensure that only nodes with heading difference less than 180 degrees compared to the initial or target vehicle state are chosen as the initial or target waypoint. When multiple nodes have the same Euclidean distance to the initial or target state, the route planner computes the route length between all pairs of initial and target waypoint candidates and use the pair with the shortest route length as the initial and target waypoint in the planning task. In this way, it is always guaranteed that there is one unique initial waypoint and one unique target waypoint despite the overlapping nodes with different heading directions contained in the dense directed graph.

In some embodiments, the distance between a node and a vehicle state is calculated as their Euclidean distance. Given the initial and target waypoints, various search algorithms can be applied to produce a route 523, which comprises of a sequence of waypoints. Each waypoint contains at least information: position and heading, and estimated cost-to-go from the current waypoint to the target waypoint. In some embodiments.

Some embodiments are based on understanding that BIAGT path planning method relies on various key concepts: tree and t-node (abbreviation of node on a tree). BIAGT can include one or combination of two trees: one start or initial tree with its initial t-node denoting the initial state of the vehicle and with its target t-node denoting the target state of the vehicle; one goal or target tree with its initial t-node representing the target state of the vehicle and its target t-node representing the initial state of the vehicle. Each tree includes a list of t-nodes which are connected through a list of t-edges (abbreviation of edge on a tree), where each t-edge represents a collision free kinematically feasible path between two t-nodes. For example, an initial tree starts with its initial t-node and grows itself by adding new collision-free t-node and t-edges toward its target t-node, with the hope to either making connection between a t-node of the tree and a t-node of another tree (this is called "two trees are connected"), or that a t-node of the tree gets close to or reaches its target t-node. BIAGT returns success if both trees are connected, or the tree includes at least one t-node which is either connected to its target t-node, or gets close to its target t-node.

Depending on implementation, a tree according to different embodiments stores one or combination of initial t-node, target t-node, running mode, list of t-nodes, list of t-nodes to be selected for node expansion, list of t-nodes for rescue, t-node selected for node expansion, success flag, etc.

Depending on implementations, a t-node according to different embodiments stores one or combination of vehicle state, t-node cost, estimated cost-to-go, parent t-node, motion primitive applied to parent t-node to reach the t-node, priority of control actions, etc. The t-node cost for a t-node on a tree is the sum of two costs: arrival cost representing the cost of driving the vehicle from the initial t-node of the tree to the state prescribed by the t-node; and an estimated cost-to-go representing the estimated cost of driving the vehicle from the state prescribed by the t-node to the target t-node of the tree. In other words, the t-node cost is an estimate of cost of a possible path between the tree's initial t-node and the target t-node passing through the t-node. Since the estimated cost-to-go of a t-node doesn't necessarily reflect the ground truth, it is often referred to as a heuristic cost or the heuristics. Obtaining accurate heuristics that can provide meaningful guidance for the search is the most challenging part for most search-based motion planners.

BIAGT grows a tree through repetitively executing two key steps: t-node selection and t-node expansion. T-node selection chooses a t-node with the minimum t-node cost. T-node expansion tries to grow the tree by applying a selected set of pre-defined motion primitives to the selected t-node. If all motion primitives of the t-node have been unsuccessfully tried out, this t-node is not being selected for t-node expansion. The computation efficiency of BIAGT is highly dependent on how accurate the heuristic cost approximates the true cost-to-go for a given t-node. Given a tree, it is possible for the BIAGT to use Reeds-Shepp (RS) path length between the t-node and the target t-node as the heuristic cost of the t-node.

However, in some embodiments, instead of computing heuristics based on an RS path length, RP-BIAGT searches for the k-nearest waypoints from the route planner solution based on Euclidean distance and computes a set of heuristics $h_i$ that add up the route planner path length from each of the nearest waypoints to the goal $h_{waypoint}$ and their RS distance to the current t-node RS(node, waypoint). The minimum of this set of heuristic values is used as the actual heuristic of the current t-node, as shown in (3).

$$h_i = RS(\text{node, waypoint}) + h_{waypoint}, i = 1, \ldots, k \quad (3)$$

$$h = \min_i h_i$$

in such a manner, some embodiments select and expend nodes of the tree based on the cost of the nodes determined not with respect to the target or initial state of the vehicle but with respect to the target or initial waypoints of the coarse path, Because the coarse path represents the shortest path connecting the initial with target waypoints, it has the smallest cost for such a connection. Hence, if the cost of the coarse path is represented with respect to the target or initial waypoints the nodes of the tree as selected on the coarse path when possible or selected to return hack to the coarse path with less deviation.

Figure 6A:
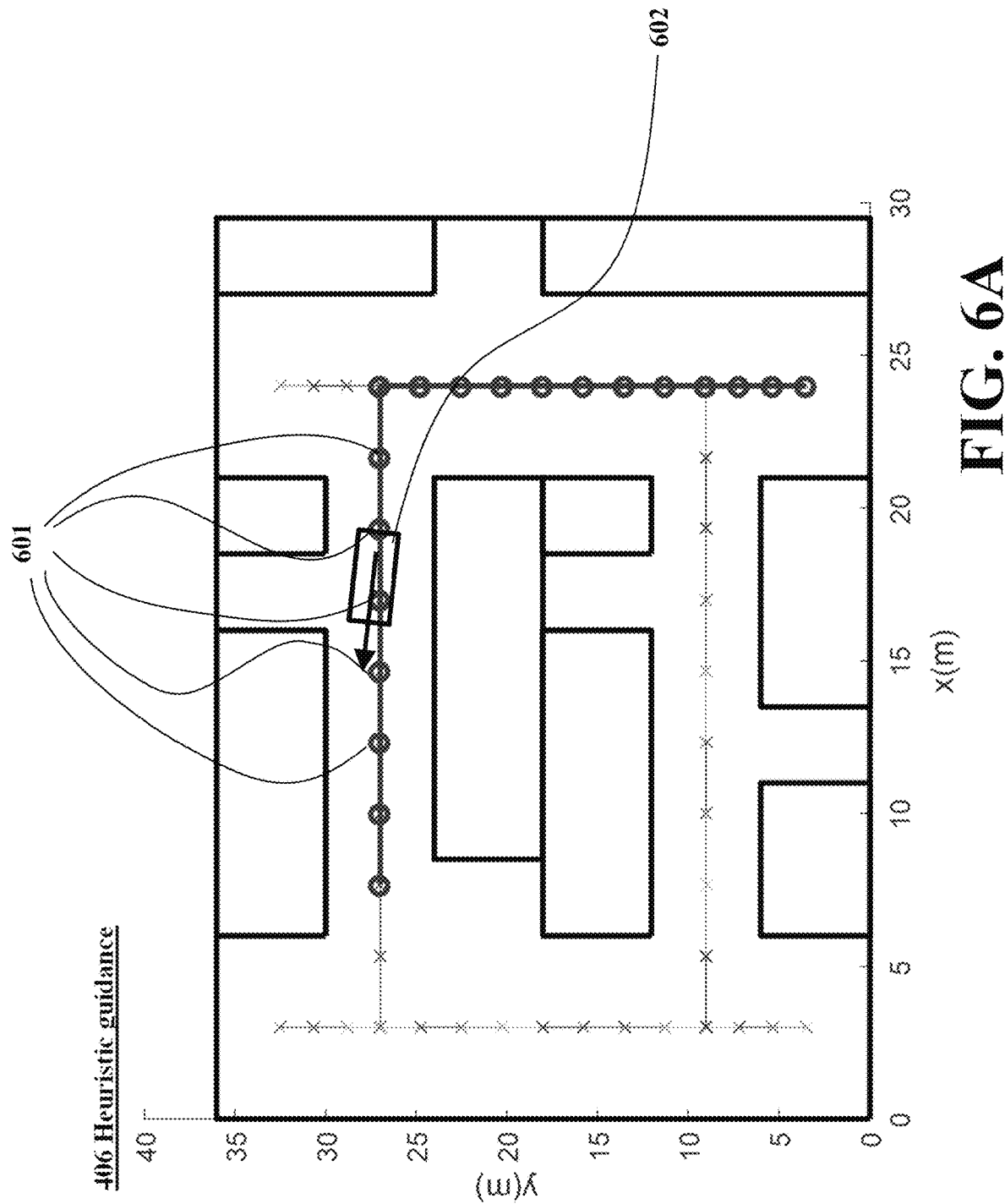
FIG. 6A shows an illustration of heuristic guidance and motion primitive trimming according to some embodiments.

FIG. 6A shows an illustration of 406 heuristic guidance and 408 motion primitive trimming according to some embodiments. After route planner 401 finds the solution route 523, BIAGT executes t-node selection and t-node expansion of start and goal trees according certain deterministic rules, under the guidance of the route solution. BIAGT performs t-node selection by choosing the t-node with the minimal t-node cost. During t-node expansion, given a t-node to expand, BIAGT 410 searches for the k waypoints 601 that are closest to the current t-node 602 according to Euclidean distance and computes heuristics based on (3), and update the t-node cost. It repeats this procedure every time when BIAGT expands a new t-node on a tree. When BIAGT is in navigation mode 645, it also checks the heading of the current t-node with k-nearest waypoints and then trim all the steering motion primitives if the heading difference between the t-node 602 and all k waypoints 601 is within a threshold ψ. This not only avoids unnecessary steering when all the waypoints nearby are heading the same direction, but also helps restrict the total number of nodes within a practical limit to satisfy the memory constraint.

Without human knowledge baked in, motion planners often come up with trajectories that are optimal in terms of path length but violate human logic. In contrast, since the route planner solution routes are constrained by the traffic direction, RP-BIAGT provides a convenient interface for enforcing natural parking behaviors.

Figure 6B:
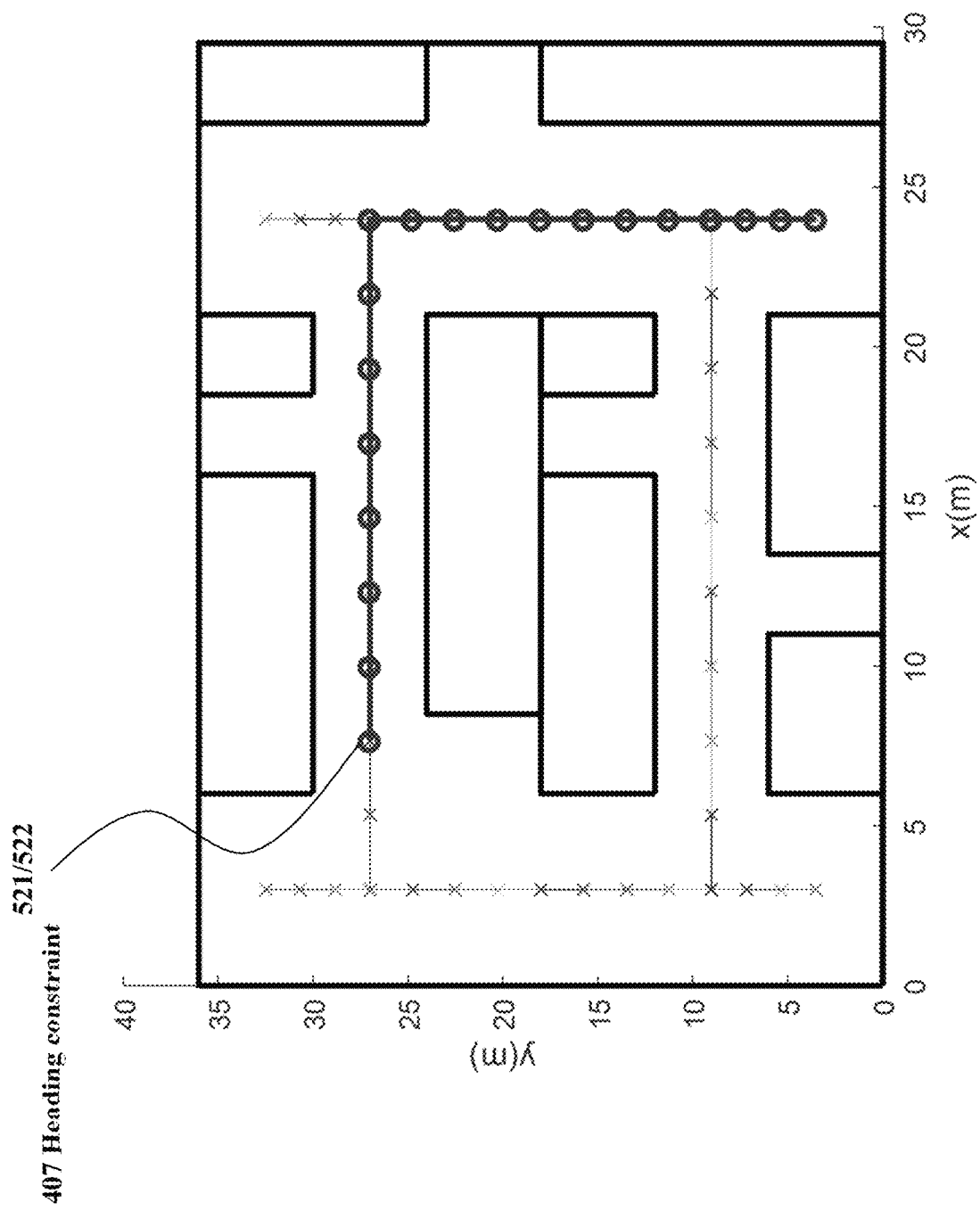
FIG. 6B shows a schematic of exemplar parking scenario according to some embodiments.

FIG. 6B shows a schematic of exemplar parking scenario according to some embodiments. As shown in FIG. 6B, the first waypoint outside of the parking spot is the initial waypoint 521 for driving-out tasks, and the target waypoint 522 for parking-in tasks. For the trees growing out of parking spots, RP-BIAGT defines a leading indicator that only turns true when the heading difference between the current node and the first waypoint outside of the parking spot is smaller than a threshold θ. Nodes on these trees will only use the first waypoint outside of the parking spot for heuristic guidance instead of the k-nearest waypoints until the heading indicator turns true, so that fixing heading is prioritized.

One disadvantage of BIAGT is that the number of nodes it requires to solve a parking task often exceeds the memory constraint of practical autonomous vehicles. In addition, although using fine grids of motion primitives during search helps maneuvering the vehicle around a parking space, it could cause the trajectory in long driveways to be unnecessarily winding. Therefore, RP-BIAGT introduces the concept of modes to distinguish different scenarios and provide suitable motion primitives. In some embodiment, RP-BIAGT could run in three modes: Parallel, Normal and Navigation, to distinguish parallel parking, normal parking and forward driving. Both Parallel and Normal modes allow backward driving, but Parallel has finer grids for motion primitives. Navigation mode only allows forward driving and uses much longer arcs for motion primitives. This classification of tree mode is to reflect the reality of automated parking system that in a tight space it is more difficult to grow a tree during t-node expansion. Hence, it is appropriate to try more motion primitives to avoid failing to grow the tree. While in an open space such as in the middle of a driveway or intersection, the failure is less likely to happen and instead the major concern is how to avoid adding too many new t-nodes/t-edges during t-node expansion; consequently, less motion primitives should be applied in such scenarios.

In some embodiments, the nodes for selection and expansion are selected based on their cost. The notion of the cost is selected to reduce the deviation of the refined path from the coarse path. For example, in one embodiment growing the tree from the initial node, the nodes of the tree are selected and expanded to reduce the cost of the nodes of the tree growing from the initial state with respect to the target waypoint, wherein a cost of a current node of the tree is a first cost of arrival to the current node through the tree from the initial node, a second cost of a kinematically feasible path connecting the current node to a waypoint of the coarse path, and a third cost of moving from the connected waypoint to the target waypoint through the coarse path. Example of the kinematically feasible path connecting the node to the waypoint of the coarse path is a Reeds-Shepard (RS) path in such a manner, the second cost and the third cost minimize a cost from the current node to the target waypoint, the target node, or both.

Additionally or alternatively, in one embodiment growing the tree from the target node, the nodes of the tree are selected and expanded to reduce the cost of the nodes of the tree growing from the target node with respect to the initial waypoint, wherein a cost of a current node of the tree is a first cost of arrival to the node through the tree from the target node, a second cost of a kinematically feasible path connecting the current node to a waypoint of the coarse path, and a third cost of moving from the connected waypoint to the initial waypoint through the coarse path.

Figure 6C:
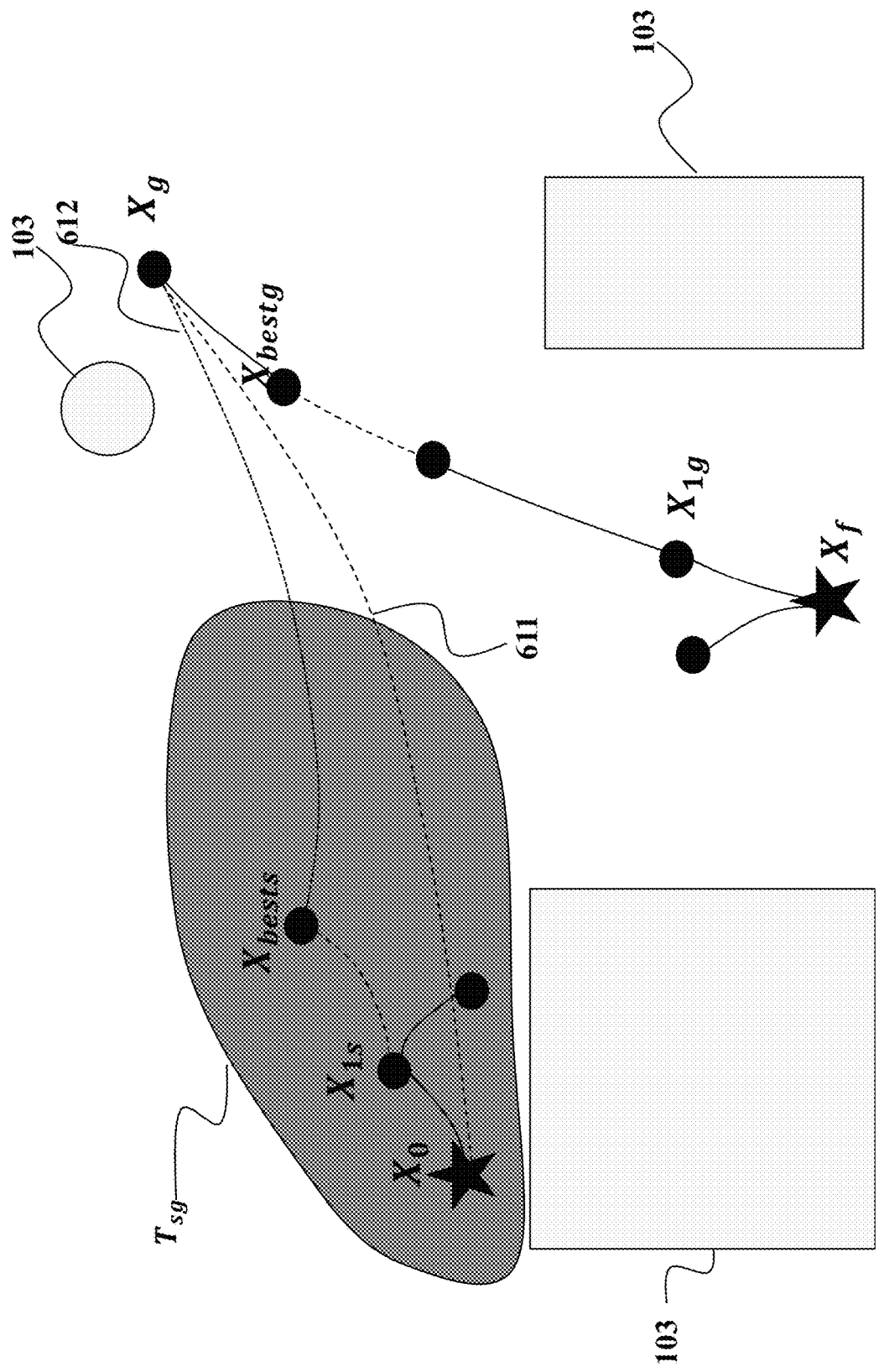
FIG. 6C shows the schematics of a method to determine a cost for a node according to one embodiment.

FIG. 6C shows the schematics of a method to determine a cost F(X) for a node X when the target tree includes multiple nodes according to one embodiment. As shown in FIG. 6C, expanding $X_0$ leads to a tree $\mathcal{T}_S$ of nodes with subscript s, whereas expanding $X_f$ leads to a tree $\mathcal{T}_g$ of nodes with subscript g. Assume that $\mathcal{T}_{g_g}$ is selected 611 for growing, and specifically node $X_{bestg}$ is selected for expansion since it has the lowest cost among $\mathcal{T}_g$. Its expansion, with a control action $A_g$, results in a child node $X_g$. The cost of the node $X_g$ is given by the sum of its arrival cost and estimated cost-to-go:

$$F(X_g)=g(X_f,X_g)+h(X_g,X_0).$$

Note that the estimated cost-to-go approximates the path-cost between $X_g$ and $X_0$.

In some embodiments, $h(X_g,X_0)$ is approximated as $l_e(X_g, X_0)$ and $l_c(X_g, X_0)$ as above. In some embodiment, $h(X_g,X_0)$ is approximated as follows $$h(X_g,X_0)=h(X_g,X_{bests})+(X_0,X_{bests}),$$

where $X_{bests}$ is the node of $\mathcal{T}_s$ having the lowest cost, $g(X_0, X_{bests})$ is the arrival cost (third cost) from $X_0$ to $X_{bests}$ and is exactly known, and $h(X_g, X_{bests})$ is an estimate of the cost-to-go between $X_g$ and $X_{bests}$. This definition of the estimated cost-to-go has a significant advantage, because only the path-cost between $X_g$ and $X_{bests}$ is estimated whereas $g(X_0, X_{bests})$ is exact.

In one embodiment, $X_{bests}$ is the node of the tree $\mathcal{T}_s$ which is closest to $X_g$. In another embodiment, $X_{bests}$ is the node which is obtained by solving the following optimization problem $$X_{bests}=\mathrm{argmin}_{X\in X_{nears}}(g(X_0,X)+h(X,X_g))$$

where $X_{nears}$ is a set defined as follows $$X_{nears}=\{X: d(X,X_g)\leq \gamma, X\in \mathcal{T}_s\}$$

Note that $\gamma$ is a positive finite constant, and $d(X_i,X_j)$ is a distance function between arbitrary two nodes $X_i$ and $X_j$. $X_{nears}$ contains all nodes on $\mathcal{T}_s$ which is within $\gamma$ distance from $X_g$. $X_{bests}$ represents the node on the tree $\mathcal{T}_s$ which gives the minimum estimated cost-to-go $h(X_0, X_g)$.

As shown in FIG. 6C, kinematically/dynamically feasible paths 612 between $X_g$ and $X_{bests}$ are, with a higher probability, shorter than kinematically/dynamically feasible paths 611 between $X_0$ and $X_g$, and thus a kinematically/dynamically feasible path between $X_{bests}$ and $X_g$ is much less likely to collide obstacles, and offers much better estimate of the cost-to-go. Similarly, a cost of a node $X_s$ on the tree $\mathcal{T}_g$ can be estimated as follows $$i\cdot F(X_s)=g(X_0,X_s)+h(X_s,X_{bestg})+g(X_{bestg},X_f),$$

where $X_{bestg}$ is the node of the list $\mathbb{L}$ having the lowest cost, $g(X_{bestg}, X_f)$ is the arrival cost (third cost) from $X_f$ to $X_{bestg}$ and is exactly known, and $h(X_s,X_{bestg})$ is the estimated cost-to-go from $X_s$ to $X_{bestg}$.

In one embodiment, $X_{bestg}$ is the node of the tree $\mathcal{T}_g$ which is closest to Xs. In another embodiment, $X_{bestg}$ is the node $\mathcal{T}_g$ which is obtained by solving the following optimization problem $$X_{bestg}=\mathrm{argmin}_{X\in X_{nearg}}(g(X_s,X)h(X,X_f))$$

where $X_{nearg}$ is a set of nodes on $\mathcal{T}_g$ such that $$X_{nearg}=\{X:d(X,X_s)\leq \gamma, X\in \mathcal{T}_g\}.$$

$X_{nearg}$ includes all nodes on $\mathcal{T}_g$ which is within $\gamma$ distance from $X_s$. $X_{bestg}$ represents the node on the tree $\mathcal{T}_g$ which gives the minimum estimated cost-to-go $h(X_s, X_f)$.

Different embodiments use different techniques for constructing the tree defining the refined path suitable for motion planning. For example, some embodiments extend the tree with edges defining kinematically feasible motions selected from a predefined set of primitive motions. In such a manner, the problem of searching for kinematically feasible section of the path reducing the cost deviation is reduced to the problem of selecting the motion primitive from the set to reduce cost deviation.

Figure 6D:
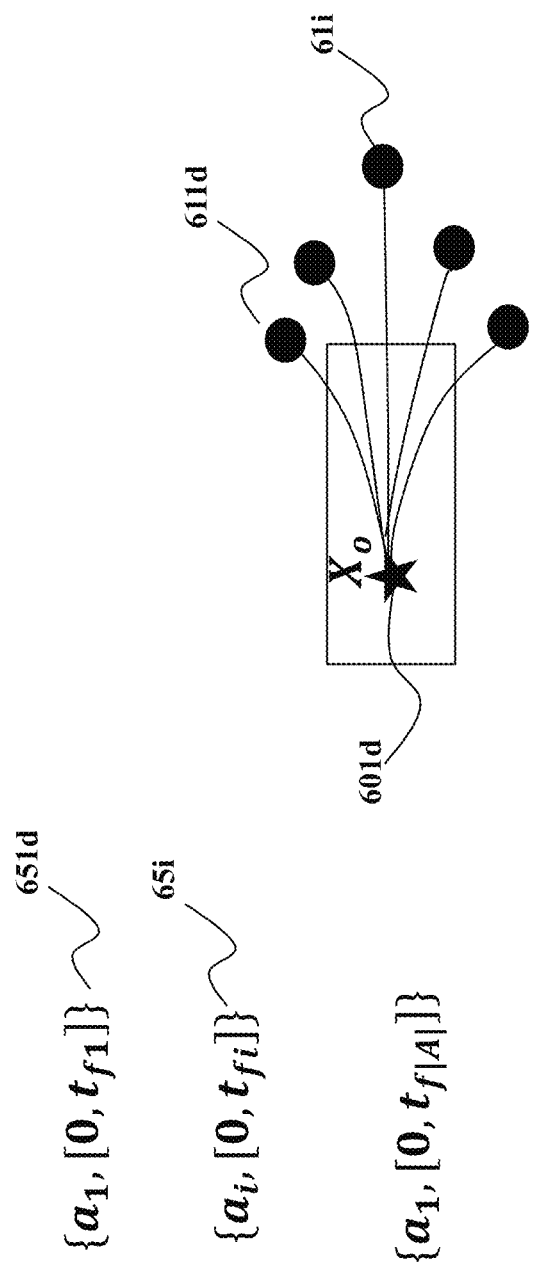
FIG. 6D shows a schematic that illustrates primitive motions associated with a set of control actions A and integration times T according to some embodiments.

FIG. 6D shows a schematic that illustrates primitive motions associated with a set of control actions $\mathbb{A}$ and integration times $\mathbb{T}$ according to some embodiments, Given the initial condition $X_0$ 601d of the vehicle model, applying primitive motion 651d corresponding to a left turn movement with a curvature yields a child node 611d. Similarly, applying primitive 65i corresponding to a different movement, e.g.; a straight movement or a turn movement with different curvature, yields a child node 61i. The set of all control actions $\mathbb{A}$ and the set of integration times $\mathbb{T}$ are designed such that distances between all node candidates of a given expandable node are at least greater than a certain threshold $\delta$ defining sparsity of the graph. In some embodiments, the distance function between two nodes corresponding to states $X_i$ and $X_j$ are defined as a weighted p-norm of the vector $X_i-X_j$: $|X_i-X_j|_p$.

In some embodiments, the kinematic vehicle model is used to generate node candidates based on the primitive motions, where a primitive motion includes a control action $A_i$: $(s_i, v_i)$ and integration time $t_{fi}$. Specifically, $s_i$ and $v_i$ is a steering angle of the vehicle steering wheel and a longitudinal velocity of the vehicle, respectively. In some embodiment, $s_i$, $1\leq i\leq |\mathbb{A}|$ uniformly distributes over $[-1,1]$; and $v_i$ only takes value on $\{-1, +1\}$.

Alternatively, the dynamic vehicle model can be used to generate node candidates based on the primitive motions, where a primitive motion includes a control action $A_i$: $(a_{si},a_{vi})$ and integration time $t_{fi}$. Specifically, $a_{si}$ and $a_{vi}$ is a steering velocity of the vehicle steering wheel and a longitudinal acceleration of the vehicle, respectively.

Some embodiments perform a node expansion, in addition to a node selection, in a deterministic manner to reduce the need to explore the space around the node with all possible motion primitives. To that end, an embodiment selects a first collision-free motion primitive that reduces the cost of the expandable node, without testing subsequent primitive motions. To further reduce the computational burden, some embodiments order a set of primitive motions based on similarity of each of the primitive motions to a primitive motion defining an edge of the graph leading to the expandable node and tests the primitive motions in that order. These embodiments encourage smoothness of vehicle movement as human operator would want, and, in practice, help to reduce the complexity of the constructed graph.

Different embodiments use different techniques to select such a motion primitive. For example, one embodiment defines different modes of tree expansion and for different modes different kinds of motion primitives can be selected to decrease the cost deviation. The mode can be selected based on a distance between a current state defined by the current node and the target state and layout of collision free space surrounding the vehicle in the current state. This is because the more freedom the vehicle has the better choices the vehicle has to track the coarse path. Conversely, if the space surrounding the vehicle is tight, the vehicle should be given more freedom to test different motion primitives, e.g. more exhaustive motion primitives should be applied to successfully grow the tree.

Some embodiments use modes such as a navigation mode, a normal mode, and a parallel parking mode. For example, a tree starts with the parallel parking mode if the initial tree node (t-rode) represents a vehicle state with tight front and rear free space; a tree starts with navigation mode if the initial t-node represents a vehicle state in an open driveway as well as at a certain distance away from a parking spot (designated by its target t-node); otherwise the tree starts with a normal mode. Transition from parallel parking mode to normal happens if the t-node of the tree chosen for t-node expansion has relatively large front and rear space; transition from navigation to normal happens if the t-node of the tree chosen for t-node expansion enters a certain neighborhood of the target t-node of the same tree.

Figure 6E:
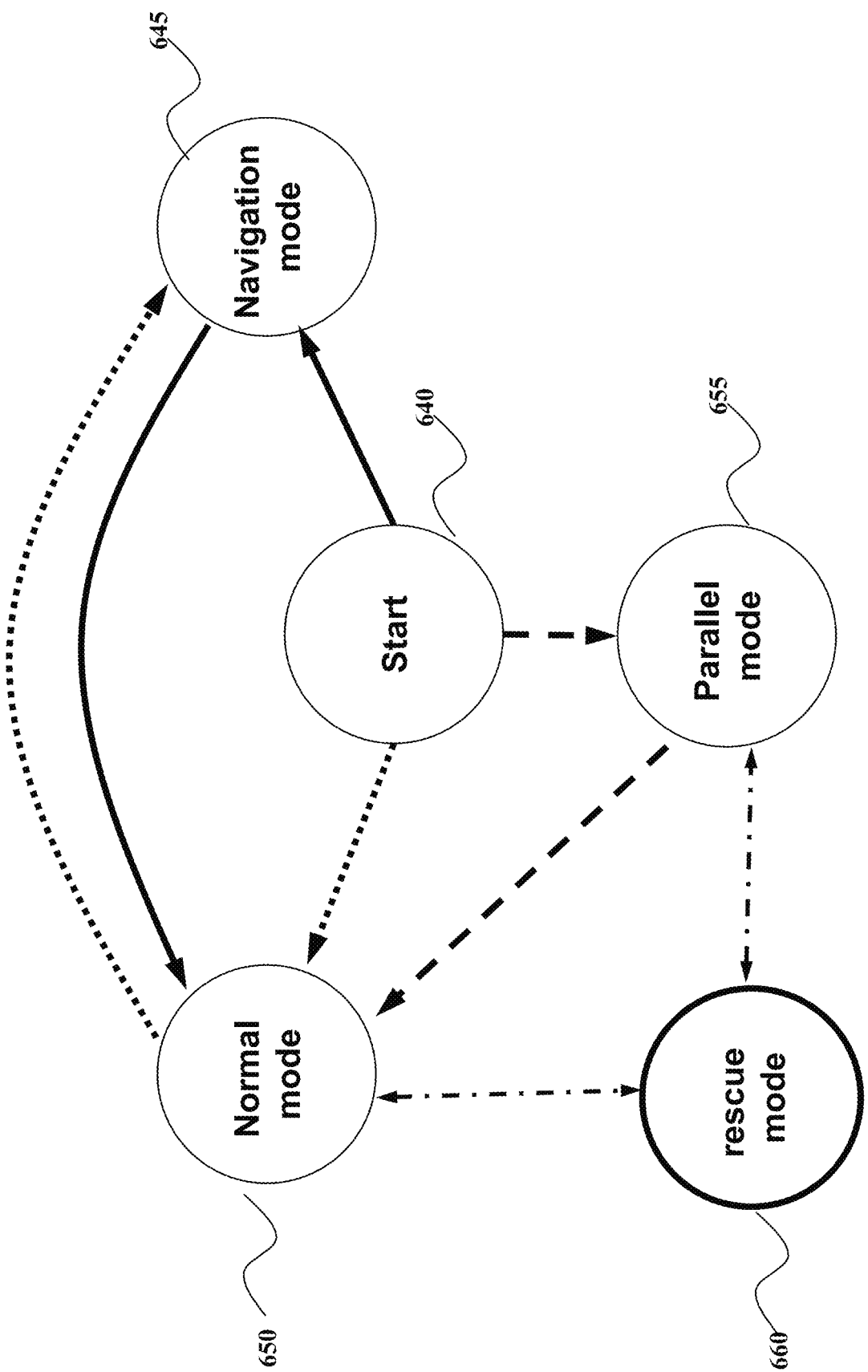
FIG. 6E shows a diagram of transition of modes RP-BIAGT according to some embodiments.

FIG. 6E shows a diagram of transition of modes RP-BIAGT according to some embodiments. Beginning with 640, RP-BIAGT allows the transition to navigation mode 645, normal mode 650, and parallel parking mode 655. A tree starts with parallel parking mode if the tree's initial t-node represents a vehicle state with tight front and rear free space; a tree starts with navigation mode if the tree's initial t-node represents a vehicle state in an open driveway as well as at a certain distance away from a parking spot (designated by its target t-node); otherwise the tree starts with a normal mode. Transition from parallel parking mode to normal happens if the t-node of the tree chosen for t-node expansion has relatively large front and rear space; transition from navigation to normal happens if the t-node of the tree chosen for t-node expansion enters a certain neighborhood of the target t-node of the same tree. In some implementations, no transition from normal mode to parallel or navigation mode is allowed, except when RP-BIAGT is called to replan, as illustrated by dot line arrow from 650 to 645. A tree could be put into rescue mode 660 from normal or parallel parking mode, in the case that all t-nodes of the tree have been selected for t-node expansion, for a given certain group of motion primitives. In rescue mode, a certain number of t-nodes which are recently chosen for t-node expansion will be open to t-node selection once again with a new set of motion primitives. Once new t-nodes have been added to the tree, the tree will be reverted back to the mode before the rescue mode.

In such a manner, the waypoints of the coarse path serve three roles in disclosed motion planning of some embodiments referred as RP-BIAGT: 1) the path length from a waypoint to the corresponding goal is used as a heuristic that guides the BIAGT search; 2) the heading of the waypoint closest to the parking space guides BIAGT to get out in the correct direction; 3) the heading of waypoints on the straight section of the driveway are utilized to trim available motion primitives for BIAGT in order to avoid unnecessary steering motions and also reduce the number of nodes required to find a feasible trajectory.

Although the static parking lot map information can often be obtained offline, it will likely not include real-time information for small, temporary road-blocks such as traffic cones or misplaced shopping carts. Therefore, real-time obstacle detection and path repairing components are useful for any robust autonomous parking solution. When newly detected obstacles invalidate the originally planned trajectory (equivalently initial path/motion), solutions typically fall into two classes: squeeze by the obstacles and follow the same route with albeit different path (path repairing), or turn back and find a different route that reaches the same goal (replanning). Higher level decision-making such as searching for a new parking space as the goal is another possibility. Some embodiments leverage decision-making at the path/motion planning level assuming that the original planning goal (the target state of the vehicle) doesn't change. Path repairing is often desired from the execution time and energy consumption point of view when the influence of new obstacles is minimal. However, when the new obstacles are large or inconveniently positioned that the available driveway is very narrow, although squeezing-by might still be feasible, it may take the motion planner a significant amount of time to repair the plan and block the traffic, and might also result in a higher collision risk if sensing noises and other uncertainties are present.

Therefore, some embodiments use a "repairing criterion" and only attempt to repair the original path when it can be done quickly. For example, some implementations model the reparability and define the repair criteria to minimize two events: repair a path while in fact it is too expensive to repair and finally resorts to replanning; activates replanning while it is cheap to repair the initial path.

Figure 7A:
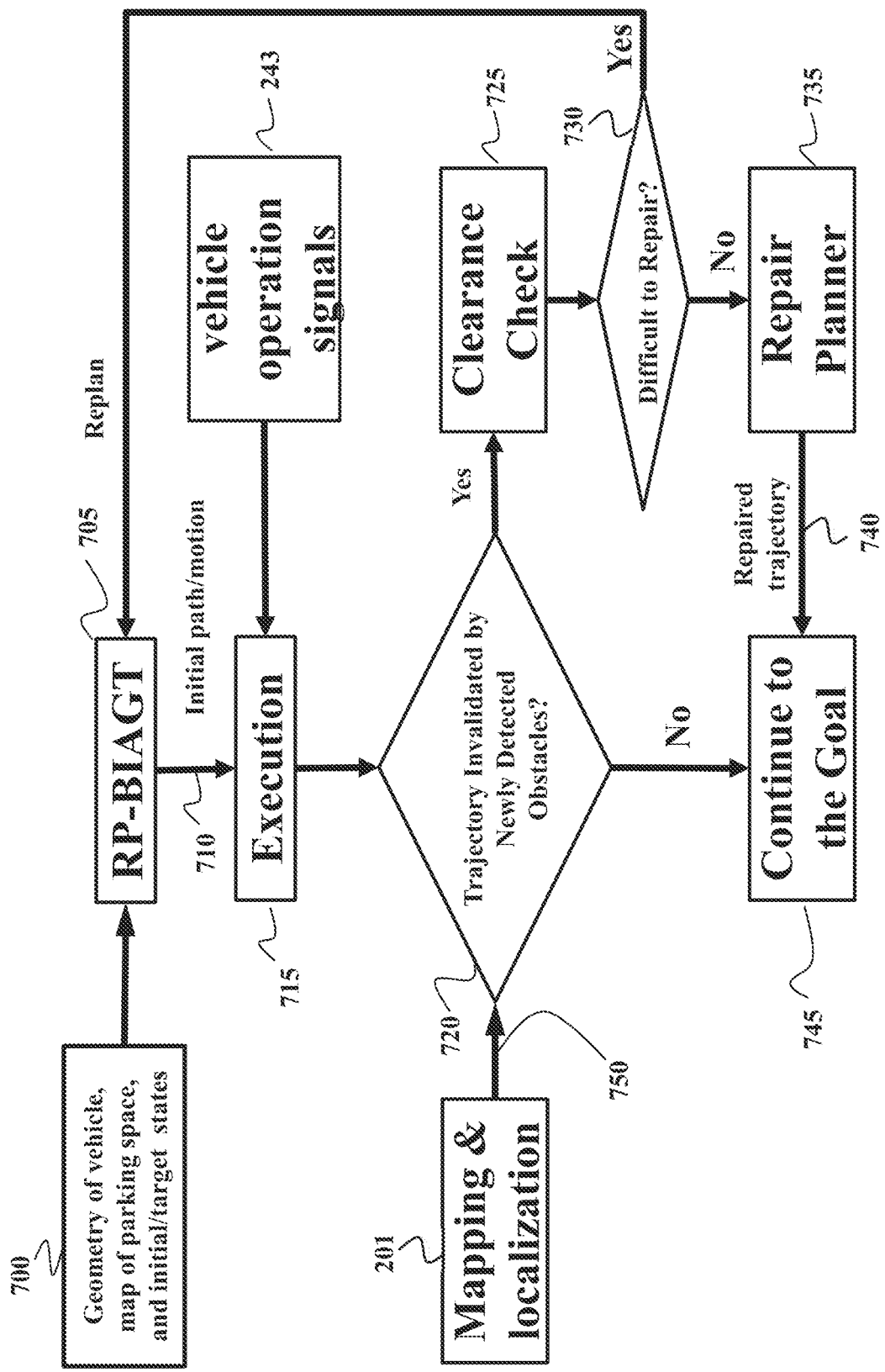
FIG. 7A shows a block diagram of a path planning method considering repairs according to some embodiments.

FIG. 7A shows a block diagram of a path planning method considering repairs according to some embodiments. Beginning with the geometry of vehicle, the map of the parking space, and initial and target states 700, the method first activates route planner guided bi-directional A-search guided tree (RP-BIAGT) method 705 to determine an initial path/motion 710. The initial path/motion 710, together with sensed signals 243, are fed into module which controls 715 the vehicle's position and orientation to follow the initial path/motion 710 over time. While executing the initial path/motion, the vehicle continuously updates the environmental map 201, by detecting new obstacles and the geometry and locations of the new obstacles. New obstacles will be checked 720 against the to-be-executed portion of the initial path/motion for interference. In case a new obstacle collides with the to-be-executed portion of the initial path, the vehicle conducts clearance check 725 and evaluates 730 whether it is too difficult to repair the initial path. If it is too difficult, a new path planning task is defined and RP-BIAGT 705 is activated to replan and update the initial path/motion; otherwise, a repair task is generated and a repair planner repairs 735 and updates the initial path/motion with a repaired trajectory. The repaired path/trajectory 740 is fed into a block 745 to execute.

Figure 7B:
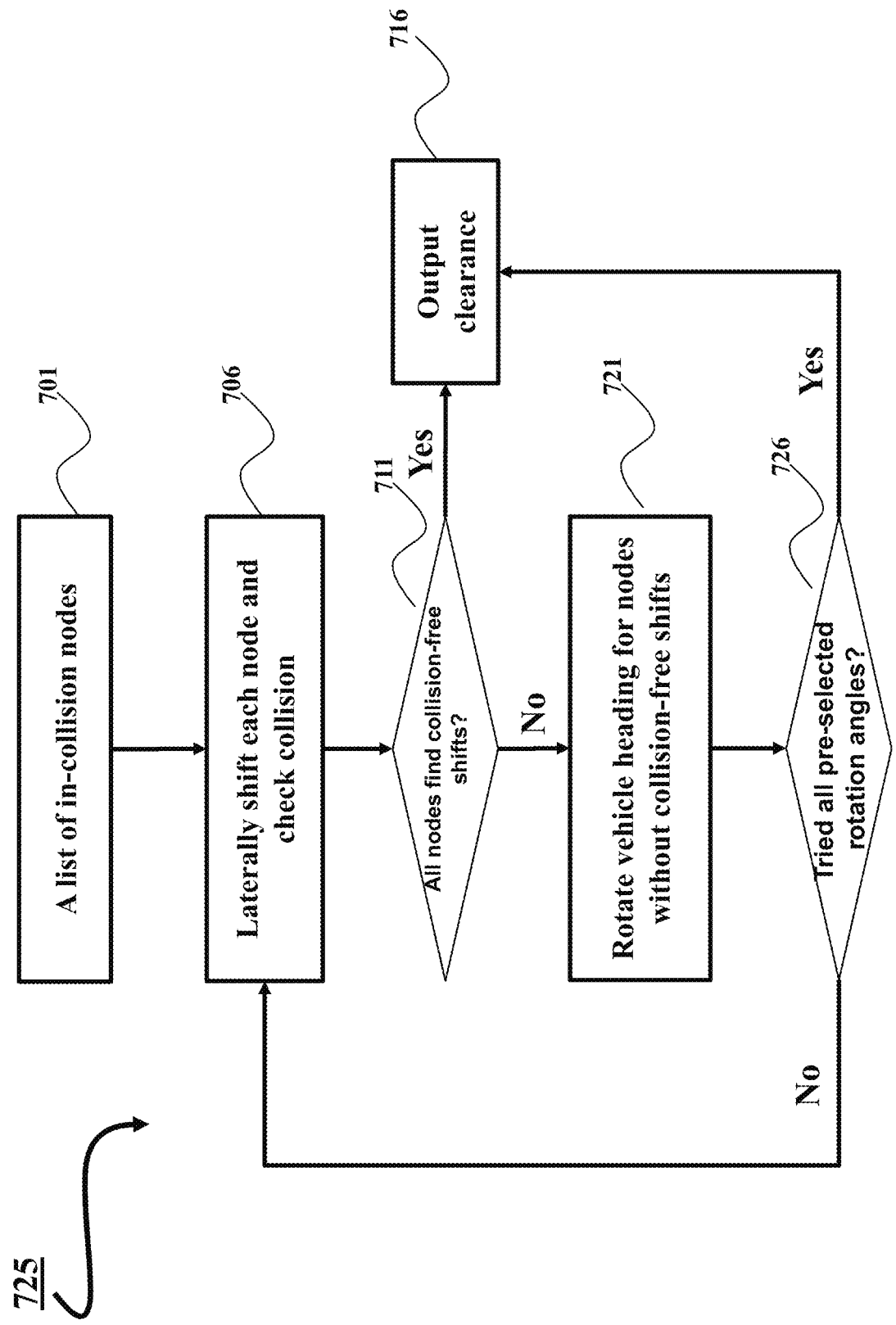
FIG. 7B shows a flow chart of a method for performing a clearance check according to one embodiment.

FIG. 7B shows a flow chart of a method for performing a clearance check 725 according to one embodiment. As shown in FIG. 7B, when a list of t-nodes 701 on the initial path/motion of the vehicle are determined to be in collision 721 with a newly detected obstacle, a clearance checking procedure is conducted. This procedure first laterally shifts 706 the collision t-node in both directions 701 in search of collision-free shifts. If collision-free shifts exist for all in-collision t-nodes 721, this embodiment outputs the clearance values 716, e.g., values of lateral shifts. If for any t-node collision-free shifts don't exist 711, the embodiment then rotates the axis 721 for nodes without collision-free shifts to repeat this procedure 706.

In some implementations, this embodiment pre-defines a set of rotation angles for the vehicle heading 726 and tests all the rotation angles until all t-nodes find collision-free shifts. If there are still t-nodes without collision-free shifts after all pre-defined rotation angles are exhausted, this embodiment can also output the clearance as well as the number of nodes without collision-free shifts.

Figure 7C:
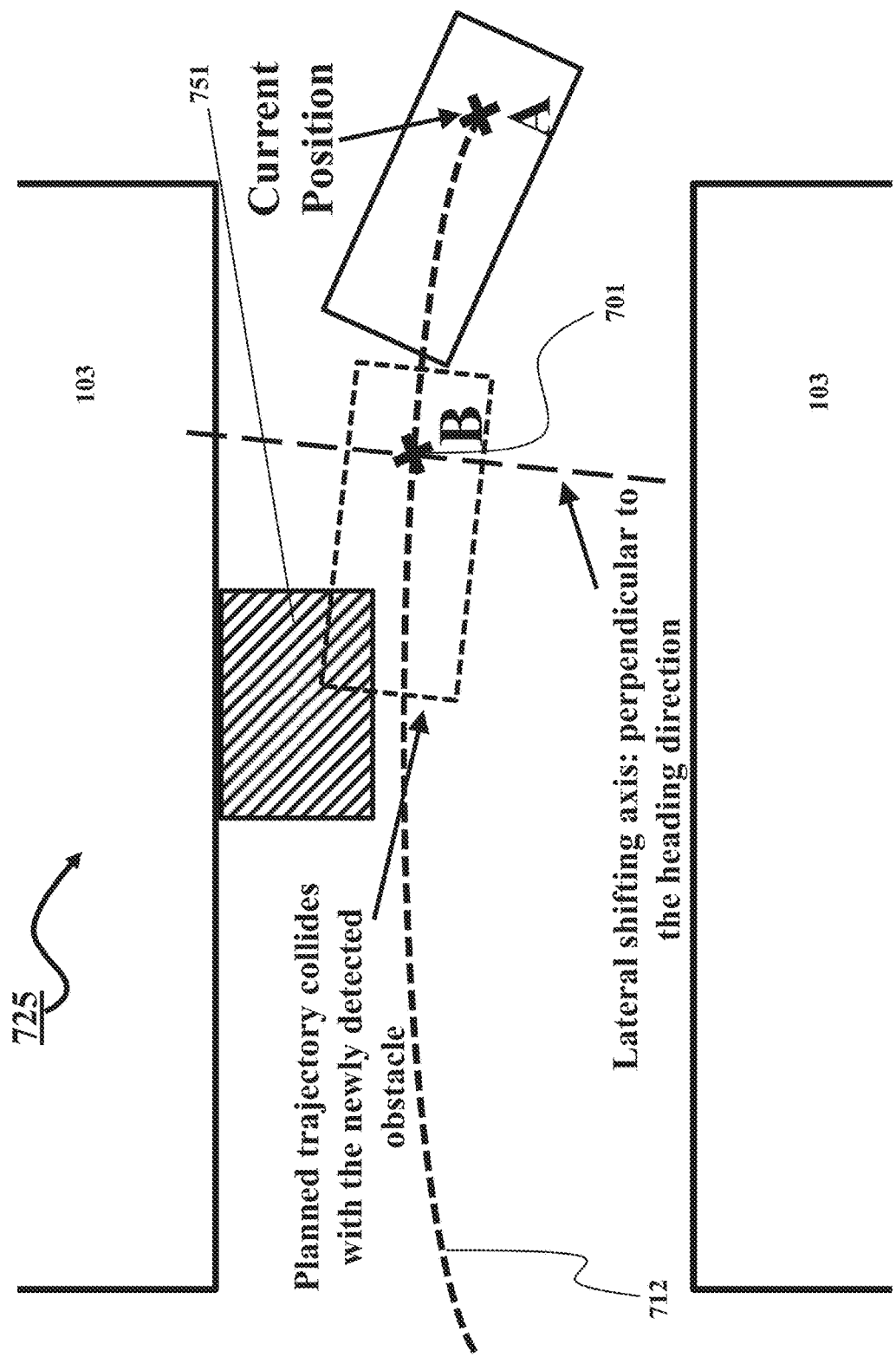
FIG. 7C shows a schematic illustrating exemplar scenario of a clearance check according to some embodiments.

FIG. 7C shows a schematic illustrating exemplar scenario of a clearance check 725 according to some embodiments. When the vehicle drives to configuration A, mapping and localization system detects and outputs 751 new obstacles. The vehicle verifies the safety of the initial path/motion 712 by checking collision with the new obstacle 751, and confirms the possible collision of multiple configurations along its planned trajectory including B with the new obstacle. For each t-node which collides with the new obstacle, the corresponding lateral axis that is perpendicular to the heading direction of the vehicle is calculated and the t-node is shifted along the lateral axis in both directions in search of collision-free shifts.

Figure 7D:
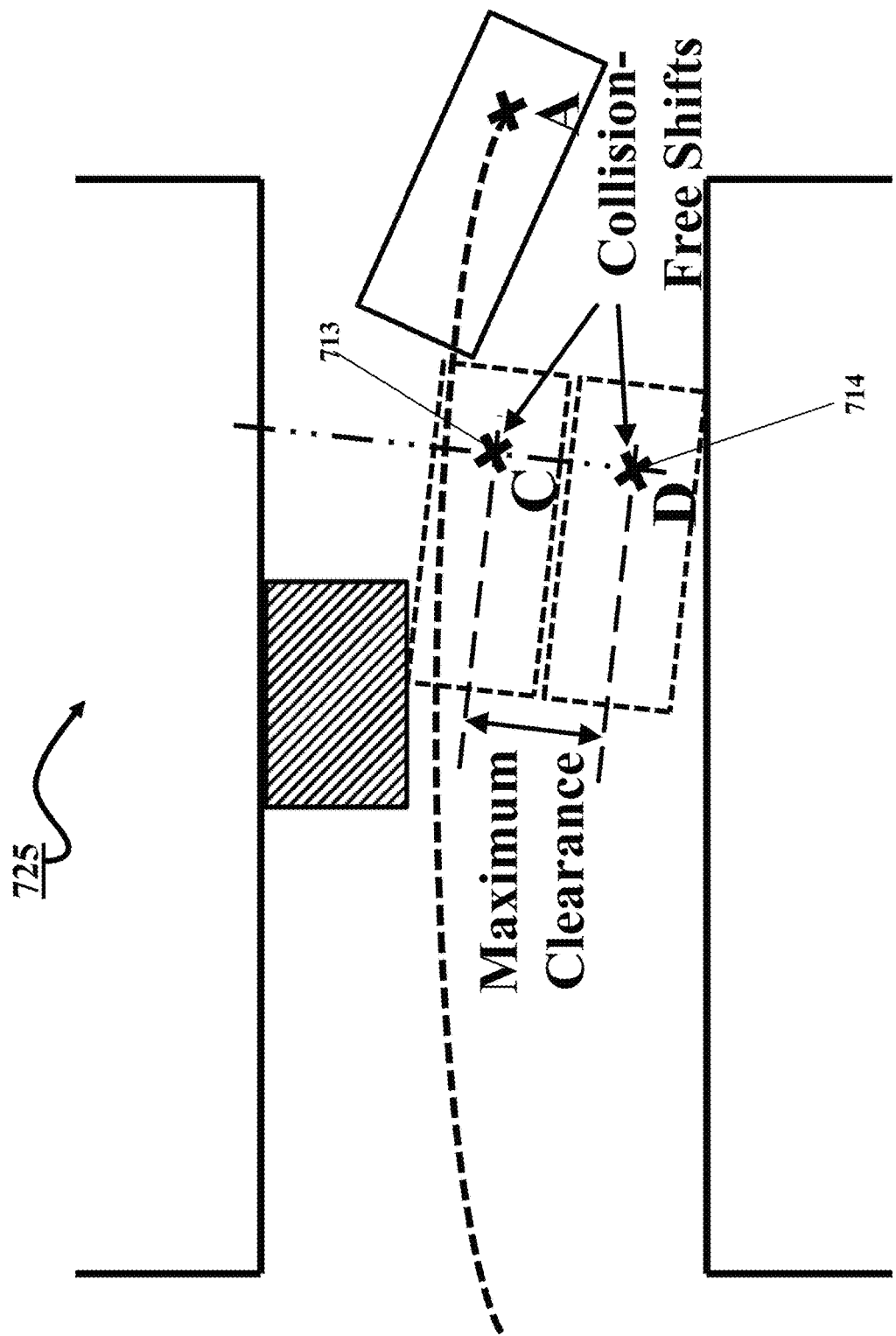
FIG. 7D shows an example of a maximum clearance determined with the clearance check according to some embodiments.

FIG. 7D shows an example of a maximum clearance as a lateral distance between 713 and 714 determined with the clearance check 725 according to some embodiments. Particularly, 713 is the first collision-free state of the vehicle when laterally moving the vehicle in one direction; whereas 714 denotes the last collision-free state of the vehicle when laterally moving the vehicle in the same direction. Collision-free shifts do not exist to the right of configuration B, and configuration C 713 and D 714 are the boundary for collision-free shifts. The lateral distance between C and D is defined as the maximum clearance. This procedure is repeated for all t-nodes in collision with the new obstacle and checks whether collision-free shifts exist.

In some embodiment, a maximum clearance is a property associated with a t-node which collides with a new obstacle. Some embodiments disclose a repairing criterion that is based on simple geometry and can be rapidly computed, given that a relatively accurate estimation on the geometry of the new obstacles can be provided by sensors so that the map information can be updated.

Figure 8A:
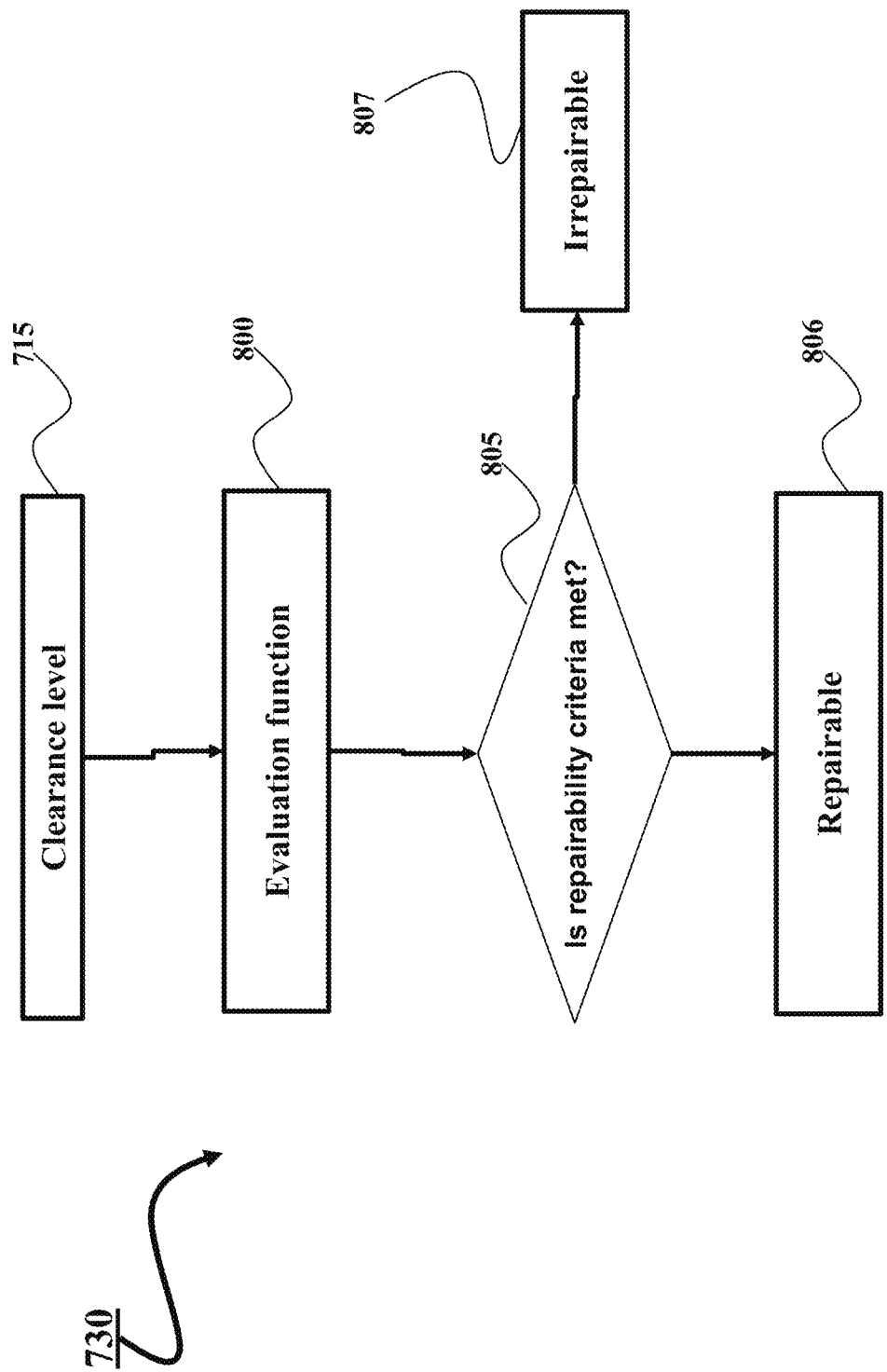
FIG. 8A shows a block diagram of a method to evaluate the difficulty of repairing the initial path based on the outcome of the clearance check procedure according to some embodiments.

FIG. 8A shows a block diagram of a method to evaluate the difficulty of repairing the initial path based on the outcome of the clearance check procedure according to some embodiments. Clearance level 715 is submitted into evaluation function block 800, which defines a mapping from the clearance level to a variable which quantifies the difficulty of repair. The output of 800 is checked against certain pre-set thresholds to classify 805 two decisions: "repairable" 806 or "irreparable" 807.

In some embodiment, the difficulty of repairing is measured by one or combination of the expected number of t-nodes required to repair, the expected computation time required to repair, and the tightness of the collision-free space around the newly detected obstacle.

In some embodiment, the evaluation function models the relationship between clearance level and the difficulty of repairing. A simple form of the evaluation function, which implies clearance level (measuring the tightness of the collision-free space around the newly detected obstacle) is directly used as an indicator of the difficulty of repairing. If for any t-node, collision-free shifts do not exist or the maximum clearance is smaller than a threshold $\eta$, then the repairing criterion is viewed as not met and RP-BIAGT will go directly to replanning Otherwise, RP-BIAGT would repair the section of the original trajectory that collides with the new obstacles and then connect it with collision-free sections of the initial path.

In some embodiments, evaluation function characterizes the relationship between clearance level and the number of t-nodes required to repair the initial path. Hence repair criteria can be the number of nodes to reflect limited memory constraint imposed by the embedded computing platform.

It is recognized that the evaluation function modeling the number of t-nodes required to repair as a function of the clearance level may not be obtained in analytic form. It is also recognized that mapping between the clearance level and the number of t-nodes required to repair might be able approximated by training a functional approximator to match a set of ground truth data which are obtained offline or online.

Figure 8B:
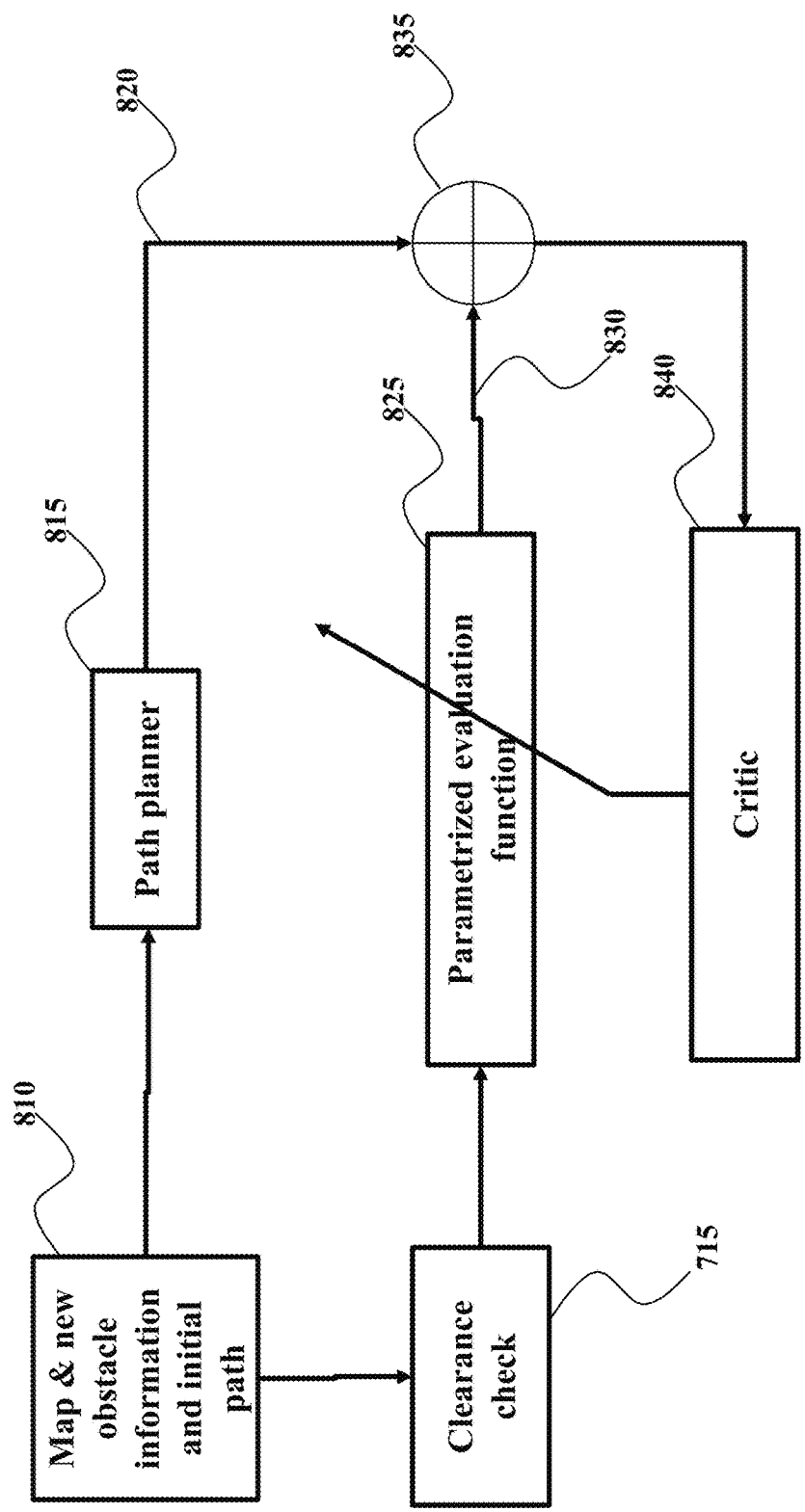
FIG. 8B shows a schematic of a procedure to obtain the representation of the evaluation function based on training data according to some embodiments.

FIG. 8B shows a schematic of a procedure to obtain the representation of the evaluation function 800 based on training data according to some embodiments. The clearance values (output of 715) and the path planner output 820 are used as the data to train the parameterized evaluation function 825. Input data to 825 are 715, which are determined by clearance check 725. Output 820 of path planner 815 could be the time to repair the initial path or number of t-nodes to repair the initial path or their combination, depending on whether computation time or memory is more important. Path planner 815 takes information from the information block 810 such as latest map, new obstacle, and initial path as input, attempts to repair the initial path, and outputs either computation time or the number of t-nodes to repair. The output 830 of block 825 and data 820 are provided to Critic block 835, where the error between 820 and 825 is calculated and processed to indicate how well the parameterized evaluation function 825 predicts the number of t-nodes required to repair in 815. A new set of parameter values is obtained in 840 by optimizing some function of the error.

In some embodiments, the evaluation function admits a form of a power series with unknown coefficients and a series of basis functions which can be evaluated at the training data. Training the evaluation function boils down to solve the coefficients which result in best matches of 820 and 830 according to a certain criterion.

Additionally, or alternatively, in some embodiments, the function of the error can be the square of Euclidean distance between 820 and 825. In some embodiment, the function of the error can be p-norm of the error with $p \in [1, \infty)$.

Additionally or alternatively, in some embodiments, it is usually prohibitive to directly connect the immediate neighbors of the collision t-nodes due to vehicle dynamics, thus RP-BIAGT starts repairing m nodes away from the collision t-nodes, where m is a customizable parameter that depends on the vehicle size and the arc lengths of motion primitives.

When RP-BIAGT determines that it is difficult to repair the original trajectory, it removes the edges that collide with the new obstacles from the dense directed graph and use the route planner to find a new route, with new initial state and the original target state. The new initial state for replanning is typically the current state of the vehicle. It then follows a procedure similar to the procedure of the initial RP-BIAGT planning to find a dynamically feasible trajectory along this route. The main difference between the replanning procedure and the original planning procedure is that the heading constraints are exploited for all trees even if they are not growing out of parking spaces. This is because re-routing typically involves turning to the opposite of the original driving direction, which is especially challenging for motion planners that minimize path lengths. Without heading constraints, the trajectories found by these planners would often instruct the vehicle to drive backwards all the way to the goal, which is the optimal plan from the path length point of view but very undesirable from human drivers' point of view. Therefore, heading constraints are imposed on all trees in addition to the goal trees that grow out of parking spots to ensure natural parking behaviors.

Figure 9:
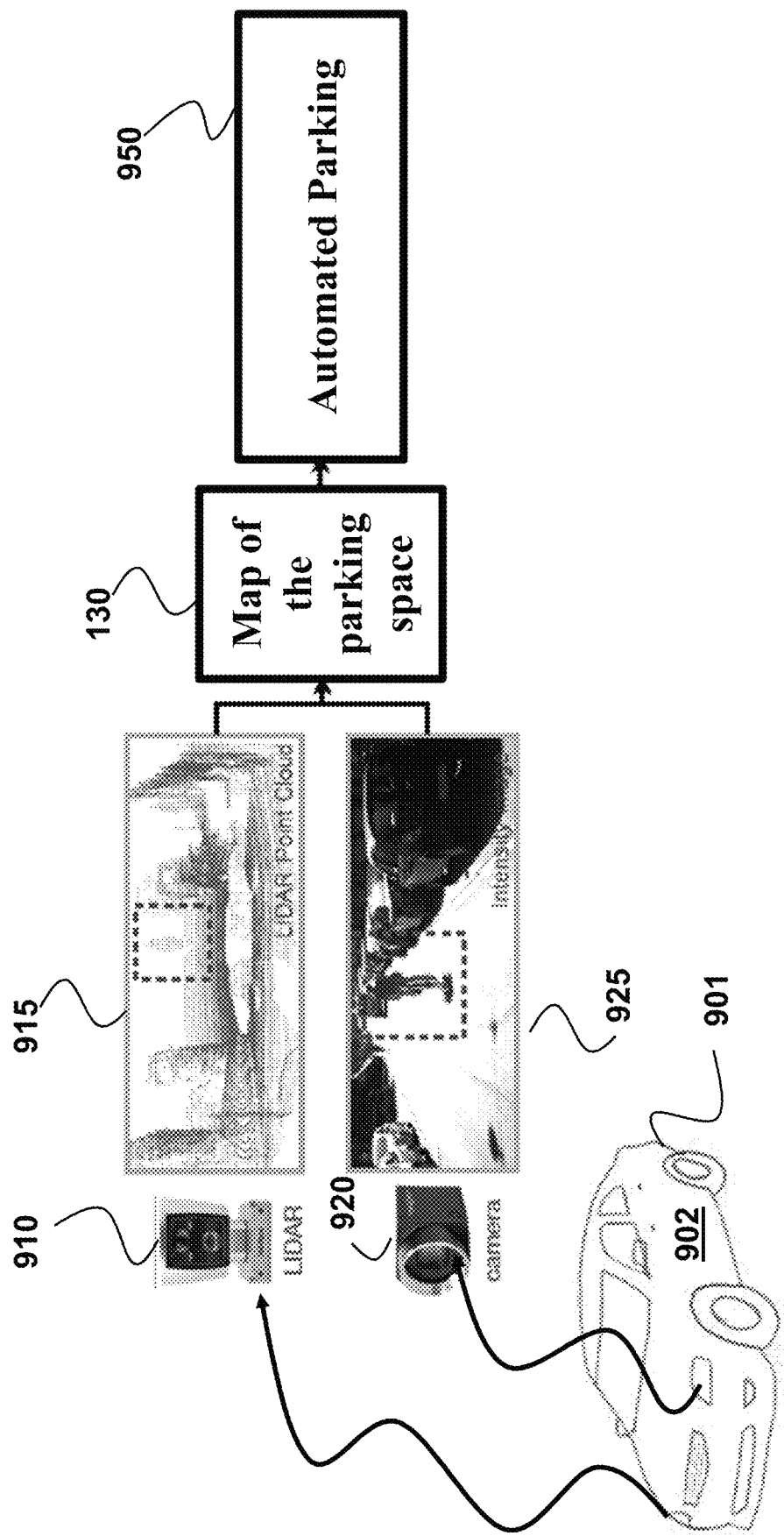
FIG. 9 is a schematic of a system according to one embodiment.
Figure 10:
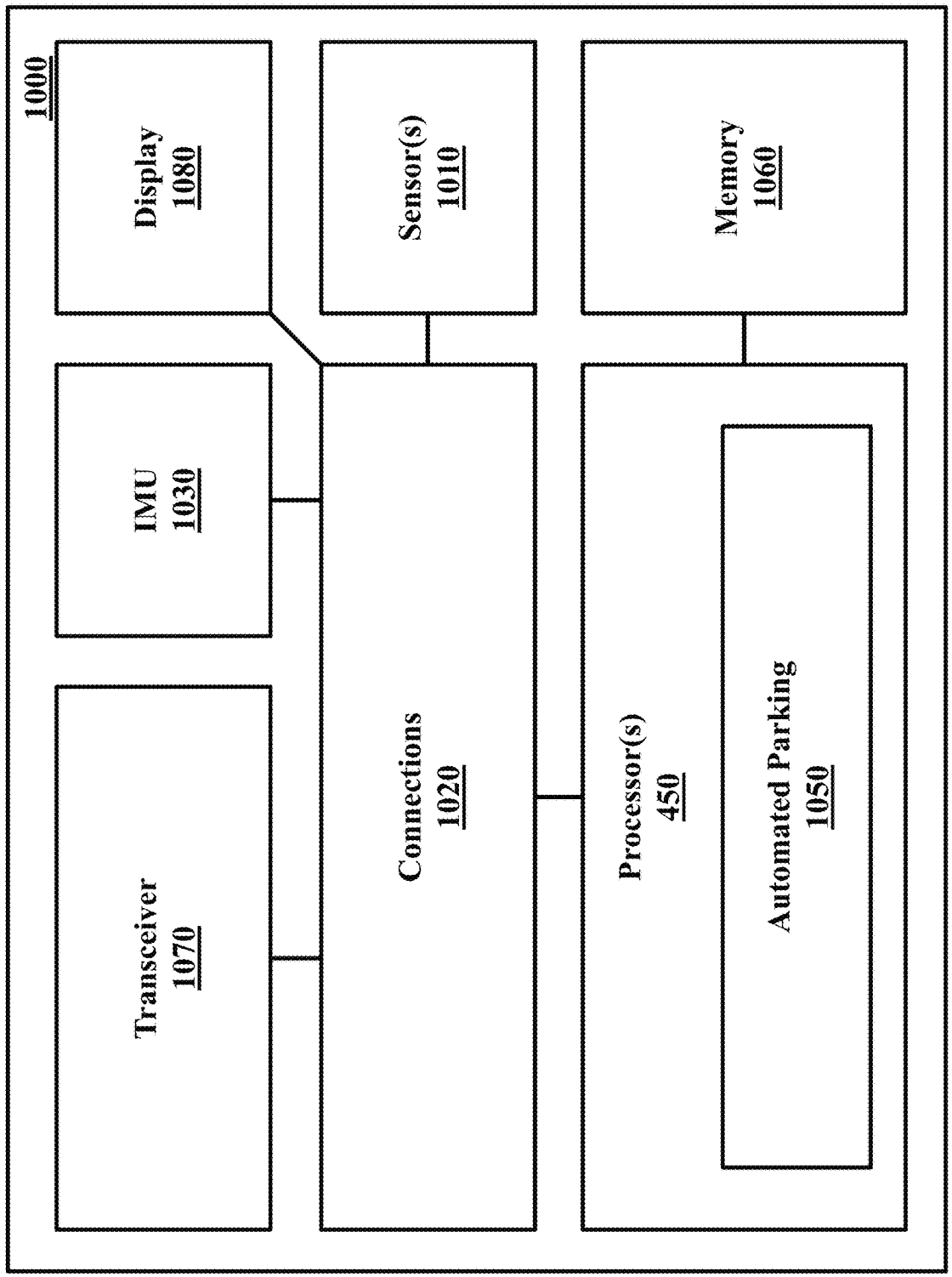
FIG. 10 is a block diagram of an automated parking system according to some embodiments.

FIG. 9 shows a schematic of a system according to one embodiment. The system includes a vehicle 901 including a processor 902 configured for performing an automated parking 950. The vehicle also includes at least one sensor, such as a LIDAR 910 and/or a camera 920. The LIDAR sensor 910 is the low-resolution first sensor and the camera 320 is the high-resolution second sensor. The sensor 910 and/or 920 is operatively connected to the processor 902 and is configured for sensing information 915 and/or 925 indicative of the geometry of at least part of the parking space. Using this information, the processor 902 determines and/or updates the map of the parking space 130. To that end, the processor 902 performs the automated parking 950 using the map 130.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking.

For example, the memory 1060 can store the measurements of the sensors, such as still images, depth information, video frames, program results, as well as data provided by the IMU 1030 and other sensors. The memory 1060 can store a memory storing a geometry of the vehicle, a map of the parking space, a kinematic model of the vehicle, and a dynamic model of the vehicle. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A control system for parking a vehicle within a parking space, comprising:
at least one processor; and
a memory having instructions stored thereon that, when executed by the at least one processor, cause the control system to:
receive an initial state of the vehicle in the parking space defining an initial position and an initial orientation of the vehicle, a target state of the vehicle in the parking space defining a target position and a target orientation of the vehicle, and a directed graph representing a traffic network within the parking space,
wherein the directed graph includes waypoints connected by edges, each waypoint defines a position and an orientation for the vehicle to move along the directed graph, each edge defines a collision free path for the vehicle from one waypoint to a next waypoint in the directed graph, wherein the directed graph is predetermined for parking different vehicles at different target states in the parking space;
identify an initial waypoint on the directed graph closest to the initial state of the vehicle, based on the initial orientation of the vehicle;
identify a target waypoint on the directed graph closest to the target state of the vehicle, based on the target orientation of the vehicle;
extract a portion of the directed graph to select a coarse path defined by a shortest route of waypoints connecting the initial waypoint on the directed graph closest to the initial state of the vehicle with the target waypoint on the directed graph closest to the target state of the vehicle, wherein the coarse path does not connect the initial state of the vehicle with the target state of the vehicle;
explore the parking space using a guided heuristic search to construct a tree having multiple nodes defining different states of the vehicle including an initial node defining the initial state of the vehicle and a target node defining the target state of the vehicle, wherein each pair of nodes in the tree is connected with an edge defined by kinematically feasible motion moving the vehicle between the states of the connected nodes without a collision, wherein the tree is constructed using the coarse path as heuristic guidance to reduce a deviation of a cost of a motion defined by a refined path connecting the initial node with the target node of the tree from a cost of the motion along the coarse path defining the route of waypoints; and control the vehicle based on the refined path.

2. The control system of claim 1, wherein the directed graph includes at least some waypoints defining same positions but different orientations of the vehicle.

3. The control system of claim 1, wherein the initial waypoint or the target waypoint is selected to provide the shortest coarse path subject to a heading constraint, such that a difference between the orientation of the vehicle defined by the initial state and the orientation of the initial waypoint or the target waypoint is below a threshold.

4. The control system of claim 1, wherein the directed graph includes intermediate waypoints connecting milestone waypoints, such that a distance between neighboring waypoints is below a threshold.

5. The control system of claim 1, wherein the cost of the coarse path is defined by a length of the coarse path, and wherein the cost of the refined path is defined by a length of the refined path.

6. The control system of claim 1, wherein the tree is constructed by one or a combination of A-search guided tree (AGT) method and a bi-directional AGT (BIAGT) method biased against the deviation from the coarse path.

7. The control system of claim 1, wherein each of the kinematically feasible motions defining the edges of the tree is selected from a predefined set of primitive motions.

8. The control system of claim 7, wherein the memory stores different sets of motion primitives, and wherein the processor is configured to select a mode for expanding a current node of the tree based on a distance between a current state defined by the current node and the target state and layout of collision free space surrounding the vehicle in the current state.

9. The control system of claim 8, wherein the processor selects the mode from a set of modes, such that a navigation mode is selected when a distance between a position of a current state of the vehicle and a position of a target state is below a navigation threshold; and a parallel parking mode is selected when collision-free front and rear space along an orientation of the vehicle at the initial state or the target state is below a parking threshold; and otherwise a normal mode is selected.

10. The control of system claim 8, the sets of motion primitives are defined to according to a navigation mode, a parallel parking mode, and a normal mode, wherein in the navigation mode, the set of motion primitives includes only forward motions with restriction on a range of steering angles;

in the parallel parking mode, the set of motion primitives includes both forward and backward motions having different length and much finer spatial resolution; and in the normal mode, the set of motion primitives includes both forward and backward motions with pre-defined lengths but without the restriction on the steering angles.

11. The control system of claim 7, wherein the nodes of the tree are selected and expanded to reduce the cost of the nodes of the tree growing from the initial state with respect to the target waypoint, wherein a cost of a current node of the tree is a first cost of arrival to the current node through the tree from the initial node, a second cost of a kinematically feasible path connecting the current node to a waypoint of the coarse path, and a third cost of moving from the connected waypoint to the target waypoint through the coarse path.

12. The control system of claim 11, the kinematically feasible path connecting the node to the waypoint of the coarse path is a Reeds-Shepp's (RS) path.

13. The control system of claim 11, wherein the second cost and the third cost minimize a cost from the current node to the target waypoint, the target node, or both.

14. The control system of claim 7, wherein the nodes of the tree are selected and expanded to reduce the cost of the nodes of the tree growing from the target node with respect to the initial waypoint, wherein a cost of a current node of the tree is a first cost of arrival to the node through the tree from the target node, a second cost of a kinematically feasible path connecting the current node to a waypoint of the coarse path, and a third cost of moving from the connected waypoint to the initial waypoint through the coarse path.

15. The control system of claim 1, wherein the processor, upon detecting an obstacle blocking the refined path, determine a clearance around the obstacle and makes a repairing plan to either repair the refined path or recompute the refine path based on a value of the clearance.

16. The control system of claim 15, wherein the processor is configured to make the repairing plan by comparing the clearance with a clearance threshold.

17. The control system of claim 15, wherein the processor is configured to make the repairing plan by submitting the clearance to a trained function.

18. The control system of claim 17, wherein the trained function outputs a number of nodes needed to repair the refined path.

19. A control method for parking a vehicle within a parking space, wherein the method uses a processor coupled with stored instructions implementing the method, wherein the instructions, when executed by the processor carry out steps of the method, comprising:

receiving an initial state of the vehicle in the parking space defining an initial position and an initial orientation of the vehicle, a target state of the vehicle in the parking space defining a target position and a target orientation of the vehicle, and a directed graph representing a traffic network within the parking space, wherein the directed graph includes waypoints connected by edges, each waypoint defines a position and an orientation for the vehicle to move along the directed graph, each edge defines a collision free path for the vehicle from one waypoint to a next waypoint in the directed graph, wherein the directed graph is predetermined for parking different vehicles at different target states in the parking space;

identifying an initial waypoint on the directed graph closest to the initial state of the vehicle, based on the initial orientation of the vehicle;

identifying a target waypoint on the directed graph closest to the target state of the vehicle, based on the target orientation of the vehicle;

extracting a portion of the directed graph for selecting a coarse path defined by a shortest route of waypoints connecting the initial waypoint on the directed graph closest to the initial state of the vehicle with the target waypoint on the directed graph closest to the target state of the vehicle, wherein the coarse path does not connect the initial state of the vehicle with the target state of the vehicle;

exploring the parking space using a guided heuristic search for constructing a tree having multiple nodes defining different states of the vehicle including an initial node defining the initial state of the vehicle and a target node defining the target state of the vehicle, wherein each pair of nodes in the tree is connected with an edge defined by kinematically feasible motion moving the vehicle between the states of the connected nodes without a collision, wherein the tree is constructed using the coarse path as heuristic guidance to reduce a deviation of a cost of a motion defined by a refined path connecting the initial node with the target node of the tree from a cost of the motion along the coarse path defining the route of waypoints; and controlling the vehicle based on the refined path.

20. A non-transitory computer-readable storage medium embodied thereon a program executable by a processor for performing a method, the method comprising:

receiving an initial state of the vehicle in the parking space defining an initial position and an initial orientation of the vehicle, a target state of the vehicle in the parking space defining a target position and a target orientation of the vehicle, and a directed graph representing a traffic network within the parking space, wherein the directed graph includes waypoints connected by edges, each waypoint defines a position and an orientation for the vehicle to move along the directed graph, each edge defines a collision free path for the vehicle from one waypoint to a next waypoint in the directed graph, wherein the directed graph is predetermined for parking different vehicles at different target states in the parking space;

identifying an initial waypoint on the directed graph closest to the initial state of the vehicle, based on the initial orientation of the vehicle;

identifying a target waypoint on the directed graph closest to the target state of the vehicle, based on the target orientation of the vehicle;

extracting a portion of the directed graph for selecting a coarse path defined by a shortest route of waypoints connecting the initial waypoint on the directed graph closest to the initial state of the vehicle with the target waypoint on the directed graph closest to the target state of the vehicle, wherein the coarse path does not connect the initial state of the vehicle with the target state of the vehicle;

exploring the parking space using a guided heuristic search for constructing a tree having multiple nodes defining different states of the vehicle including an initial node defining the initial state of the vehicle and a target node defining the target state of the vehicle, wherein each pair of nodes in the tree is connected with an edge defined by kinematically feasible motion moving the vehicle between the states of the connected nodes without a collision, wherein the tree is constructed using the coarse path as heuristic guidance to reduce a deviation of a cost of a motion defined by a refined path connecting the initial node with the target node of the tree from a cost of the motion along the coarse path defining the route of waypoints; and controlling the vehicle based on the refined path.

\* \* \* \* \*